(12) United States Patent
Slotznick et al.

(10) Patent No.: US 7,194,411 B2
(45) Date of Patent: Mar. 20, 2007

(54) METHOD OF DISPLAYING WEB PAGES TO ENABLE USER ACCESS TO TEXT INFORMATION THAT THE USER HAS DIFFICULTY READING

(75) Inventors: Benjamin Slotznick, 507 Third St., Mt. Gretna, PA (US) 17064; Stephen C. Sheetz, Lebanon, PA (US)

(73) Assignee: Benjamin Slotznick, Mt. Gretna, PA (US)

( * ) Notice: Subject to any disclaimer, the term of this patent is extended or adjusted under 35 U.S.C. 154(b) by 758 days.

(21) Appl. No.: 10/084,582

(22) Filed: Feb. 25, 2002

(65) Prior Publication Data

US 2002/0178007 A1 Nov. 28, 2002

Related U.S. Application Data

(60) Provisional application No. 60/271,677, filed on Feb. 26, 2001.

(51) Int. Cl.
*G10L 11/00* (2006.01)
*G10L 21/06* (2006.01)
*G06F 17/20* (2006.01)

(52) U.S. Cl. .................. 704/271; 704/270; 704/270.1; 704/1; 704/9

(58) Field of Classification Search .................... 704/1, 704/9, 260, 270, 271, 270.1
See application file for complete search history.

(56) References Cited

U.S. PATENT DOCUMENTS 5,287,102 A 2/1994 McKiel, Jr.
5,528,739 A 6/1996 Lucas et al.
5,715,370 A 2/1998 Luther et al.
5,748,186 A 5/1998 Raman
5,899,975 A 5/1999 Nielsen
6,018,710 A 1/2000 Wynblatt et al.
6,023,714 A * 2/2000 Hill et al. .................... 715/513
6,085,161 A 7/2000 MacKenty et al.
6,115,686 A 9/2000 Chung et al.

(Continued)

OTHER PUBLICATIONS

Speaks for Itself Talking Web Sites, printout from web site: http://www.speaksforitself.com/speaksforitself/talkingsites.cfm?CFID=1327376&CFTOKEN=48412529 DirectXtras, Inc., printout date: Feb. 15, 2002, original web page posting date: unknown, 4 pages.

(Continued)

*Primary Examiner*—Richmond Dorvil
*Assistant Examiner*—Thomas E. Shortledge
(74) *Attorney, Agent, or Firm*—Akin Gump Strauss Hauer & Feld, LLP

(57) ABSTRACT

Web pages and other text documents displayed on a computer are reformatted to allow a a user who has difficulty reading to navigate between and among such documents and to have such documents, or portions of them, read aloud by the computer using a text-to-speech engine in their original or translated form while preserving the original layout of the document. A "point-and-read" paradigm allows a user to cause the text to be read solely by moving a pointing device over graphical icons or text without requiring the user to click on anything in the document. Hyperlink navigation and other program functions are accomplished in a similar manner.

34 Claims, 13 Drawing Sheets

U.S. PATENT DOCUMENTS

| | | | |
|---|---|---|---|
| 6,324,511 B1 * | 11/2001 | Kiraly et al. | 704/260 |
| 6,442,523 B1 * | 8/2002 | Siegel | 704/270 |
| 6,580,416 B1 * | 6/2003 | Gardner | 345/157 |
| 6,665,642 B2 * | 12/2003 | Kanevsky et al. | 704/260 |
| 6,708,152 B2 * | 3/2004 | Kivimaki | 704/260 |
| 6,728,763 B1 * | 4/2004 | Chen | 709/219 |
| 2002/0065658 A1 * | 5/2002 | Kanevsky et al. | 704/260 |

OTHER PUBLICATIONS

Microsoft Agent 2.0 Setup (includes step to Install the Lernout & Hauspie TruVoice Text-to-Speech Engine), printout from web site: http://www.msagentring.org/setup.htm printout date: Feb. 15, 2002, original web page posting date: unknown, 2 pages.

HELP Read Beta.92, printout from web site: http://www.davecentral.com/projects/helpread/ printout date: Feb. 26, 2001, original web page posting date: unknown, 5 pages.

CAST eReader, printout from web site: http://www.cast.org/udl/index.cfm?i=211 printout date: Feb. 26, 2001, original web page posting date: unknown, 5 pages.

JAWS Screenreader for the Blind and Visually Impaired, printout from web site: http://www.worklink.net/jaws.htm, printout date: Feb. 20, 2001, original web page posting date: unknown, 1 page.

Parsing with Perl Modules by Teodor Zlatonov, printout from IBM web site: http://www-106.ibm.com/developerworks/linux/library/perl-parsing/ printout date: Feb. 15, 2002, article date: Apr. 2000, 6 pages.

DevGuru HTML core attribute: onmouseover, printout from web site: http://www.devguru.com/Technologies/html/quickref/html_core_onmouseover.html printout date: Feb. 11, 2002, original web page posting date: unknown, 2 pages.

Clickless Ad, printouts from cnet.com web site: http://builder.cnet.com/webbuilding/0-7600-8-5828510-1.html?tag=st.bl.7600-8-5828113-1.txt.7600-8-_printout date: Feb. 15, 2002, date submitted to web site: Jun. 24, 1998, original web page posting date: unknown, 3 pages.

HTML Tutorials: Span Tag, printout from web site: http://hypergurl.com/span.html printout date: Feb. 8, 2002, original web page posting date: unknown, 2 pages.

Clickless Link by Joey Mornin, printouts from web site: http://www.scriptlib.com... printout date: Feb. 12, 2002 and Feb. 15, 2002, original web page posting date: unknown, 5 pages.

Events and Event Handlers: onMouseOver, printout from Netscape web site: http://developer.netscape.com/docs/manuals/communicator/jsref/evnt17.htm printout date: Feb. 15, 2002, original web page posting date: unknown, 2 pages.

BrowseAloud User Manual dated Aug. 23, 2002, printout from Spectronics web site: http://www.spectronicsinoz.com/library.asp?article=12331&display=print, printout date: Jul. 25, 2003, 4 pages.

BrowseAloud Screen Reader, Press Release dated Nov. 26, 2002, printout from Access Ingenuity web site: http://www.accessingenuity.com/Product%20 Pages/browsealoudpressrelease.htm, printout date: Jul. 25, 2003, 2 pages.

WordSmith v2.0 article describing Jan. 15, 2001 product launch, printout from Sight and Sound Technology website: http://www.sightandsound.co.uk/pages/WordSmith_intro_print.htm, printout date: Jul. 25, 2003, 2 pages.

textHELP!® Support Centre, Discussion Area with message posting about BrowseAloud from May 16, 2001 through Jul. 18, 2002, printouts from textHELP website (and links therein): http://www.texthelp.com/discussion/forum.asp?ForumID=5&section=support, printout date: Jul. 25, 2003, 8 pages.

Corrected International Preliminary Examination Report (IPER) for PCT/US02/06041, mailed Apr. 3, 2003, 10 pages.

International Preliminary Examination Report (IPER) for PCT/US02/06041, mailed Dec. 13, 2002, 4 pages.

Bonner, P., "And Web Sites for All," Internet Professional -Solutions for Web Designers and Builders, PC Magazine, May 7, 2002, IP01-IP03 (3 pages).

Search Report for GB0509518.7 Patent Application, mail date of Search Report: Jul. 6, 2005, 1 page.

International Search Report for PCT/US02/06041, mail date: May 31, 2002, 1 page.

* cited by examiner

METHOD OF DISPLAYING WEB PAGES TO ENABLE USER ACCESS TO TEXT INFORMATION THAT THE USER HAS DIFFICULTY READING

CROSS-REFERENCE TO RELATED APPLICATIONS

This application claims the benefit of U.S. Provisional Application Ser. No. 60/271,677 filed Feb. 26, 2001 entitled "A METHOD OF DISPLAYING WEB PAGES TO ENABLE USER ACCESS TO TEXT INFORMATION THAT THE USER HAS DIFFICULTY READING."

COMPACT DISC APPENDIX

This patent application includes an Appendix on one compact disc having a file named appendix.txt, created on Feb. 22, 2002, and having a size of 35,145 bytes. The compact disc is incorporated by reference into the present patent application.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND OF THE INVENTION

Current computer programs called "screen readers" use text-to-speech software to "read" the text displayed on a computer screen. (One example is the JAWS screen reader program, available from A.D.A. WorkLink, Berkeley, Calif. Another is Microsoft's Narrator accessibility software built into Windows 2000.) Some have been adapted for or incorporated into web browsers, in order to "read" web pages or e-mail. Because this class of software has generally been designed for the blind or visually impaired, the reader must also provide aural signals of important non-text information, such as symbols, non-standard punctuation, and a description of pictures embedded in the text. When the screen reader is intended to read web pages, the screen reader also has to describe animations or videos, and signal when a "button" or "link" can be activated, as well as what the button does and where the link navigates. To do this, the screen reader "parses" the digital code that makes up the text and formatting instructions for the page. The actual text is put in the proper form for the text-to-speech software without the extra formatting codes needed for page display (e.g., margins, italics, etc.). Some of the formatting codes cause the parsing program to insert additional code for the text-to-speech reader. For example, formatting code to place a word in boldface might be changed to add code that makes the text-to-speech program speak that word louder. In other instances, the parsing program inserts words to describe what the formatting code sought to accomplish. For example, an image tag in a web page may include not only the source of the image, but a textual description of what the image is or shows (the text following the "alt" tag). A screen reader would then indicate through aural tones, or spoken words that the page contained an image, and the screen reader would speak the description of image. Similarly, a screen reader that encounters a hyperlink would indicate that an image or text is acting as a link in addition to reading the text or describing the image using the alt tag text. The screen reader might even read the address of the page to which the hyperlink links. (This is information that a sighted person would see on the browser's status line when the cursor is placed over the link.)

Some screen readers have also been developed as reading aids for the sighted, particularly sighted persons who have difficulty learning to read. Two examples are the CAST eReader, available from CAST, Peabody, Mass., and the HELPRead™ plug-in, available from the Hawaii Education Literacy Project (HELP), Honolulu, Hi.

The CAST eReader will read documents or web pages. The user places the cursor focus in front of the text on a document that he or she wants the eReader to read. This is performed by placing the cursor at that location and then clicking the left mouse button. The eReader will then read the next letter, word or sentence (depending upon user settings, however, for web pages, only whole sentences are read). As the eReader vocalizes the text, it will "highlight" the letter, word or sentence being read (depending upon user settings, however, for web pages, only words are highlighted). (When a word is "highlighted" its background shows a different color as if it had been highlighted by a magic marker.) The eReader can read one piece of text at a time, or automatically continue through an entire document. The user can also highlight a portion of text (by pointing and clicking with a cursor), and then click on a button for the eReader to read that text. The eReader can also be automatically set to begin reading from the top any web page it encounters.

The HELPRead plug-in has a different interface but performs similar functions: user identification of text to be read by point-and-click or by highlighting, and highlighting text while it is being read. The HELPRead plug-in will also read any text placed in the clipboard.

Both of these readers are either fully automated reading from top to bottom of a document, or they require a double step point-and-click.

There are other current uses for such parsing routines. Some websites for translation services allow the user to specify the address of a web page, and then parse that entire page, translating all text, but not translating the formatting code, and causing the translated page to appear in the user's web browser, with the same or similar formatting, images, typeface, etc. as the original web page. (An example is the www.systransoft.com website of Systran S.A., France/Systran Software, San Diego, Calif.) However, unlike the previous example, the parsing is done at the translation website's server, rather the user's computer.

Some "portal" websites like Octopus (Octobus.com, LLC, Palo Alto, Calif.) allow the user to create a personalized web page, by identifying other web pages and specifying material in that other web page. When the user next visits Octopus, Octopus in the background creates the personalized web page for the user by parsing those other websites for the requested information and reconstituting it on an Octopus page, before delivering it to the user.

Text-to-speech software has also been adapted as plug-ins for Internet browsers. These may be stand-alone speech synthesis programs, or may be coupled with an animation program, so that a "cartoon" will appear to speak the words. Two such programs are the Haptek Virtual Friend animation program (available from Haptek, Inc., Santa Cruz, Calif.) which in February 2001 was coupled with DECtalk text-to-speech program (available from Fonix Corporation, Draper, Utah) and the Microsoft Agent animation program which is frequently coupled with the Lernout & Hauspie TruVoice text-to-speech program. (Apple computer also has a text-to-speech program called PlainTalk.) These various plug-ins can be accessed from web pages that have embedded the appropriate code, causing certain predesignated portions of the web page to be spoken. The web page designer/creator decides which portions of the web page will "talk".

An authoring application that helps web designers use Microsoft Agent is Buddy Builder by Shelldrake Technologies, Concord, N.H. A web page that uses this software includes a link, that when activated, launches a new browser window. The new browser window displays a modified version of the web page. This web page will "speak" when the browser registers various events (e.g., onLoad, onMouseover, onClick) with respect to specific page elements. This program only speaks certain page elements previously designated by the web page author.

Prior to Feb. 26, 2001, the Simtalk website (www.simtalk.com) allowed users to specify certain websites (such as news on Yahoo, or books in the Gutenberg Project). The Simtalk software parsed the website, and placed it in a form compatible with text-to speech software. An animated head appeared on the computer monitor, along with a new window with control buttons. When the user clicked on the "read" button, the text-to-speech software read portions of the website preselected by Simtalk, while the animated head moved its mouth in synchronization with the words (called "lip-syncing" the words). This process worked by executing an independent software program (i.e., the Simtalk software) which parsed sentences and text strings from web pages and loaded them into an array of a table. When the user clicked on the window of the Simtalk software reader, the sentences in the table were sequentially read one-by-one out of the array, loaded into a text-to-speech function, and spoken.

In U.S. application Ser. No. 09/974,132 filed Oct. 9, 2001, entitled "METHOD OF PROCESSING INFORMATION EMBEDDED IN A DISPLAYED OBJECT," incorporated herein by reference, text from one web page could be copied from one window (using drag-and-drop or copy-and-paste operations) to another window, where it would be put in the proper form to be read by text-to-speech software.

Many people have difficulty reading any specified text document, even if they are not blind. People have difficulty reading a document that is not written in their native or ethnic language. (In the United States, this literacy problem is attacked by the special educational programs and efforts referred to as "ESL" programs or "English as a Second Language.") People have difficulty reading a document that is written with technical terms that they are not familiar with. People have difficulty reading a document that is written with more difficult words or sentence constructions than they are competent to decipher. (For example, in the United States, almost a quarter of the adult population reads at or below the fourth grade level and has difficulty reading and understanding the directions on the back of a medicine bottle.) Other people have difficulty reading any text because of dyslexia, mental retardation, or various developmental or cognitive disabilities. Other people have difficulty reading because of cultural or educational disabilities. Some of those who have difficulty reading may be sighted but have motor control disabilities which make drag-and-drop, point-and-click or copy-and-paste operations difficult.

Some electronic texts (such as some web sites) provide alternate texts in a few different languages. Some web sites provide automated machine translation of any text or web page that is submitted to them, by displaying text in the requested language. There are a variety of text-to-speech software packages that a user can install and submit text to, whereby the text is converted to the sound of a synthesized voice speaking the words. These applications generally require that the user is competent with reading and manipulating high school level text in at least one language. Text-to-speech browsers are also an expense for those in the lower socio-economic levels, frequently costing end users over $100. Use of such specialized browsers is also likely to stigmatize the users who may otherwise effectively hide their reading difficulties.

Some electronic texts embed audio clips, such as songs, interviews, commentary, or audio descriptions of graphics. However, production time and storage capacity requirements limit their use.

BRIEF SUMMARY OF THE INVENTION

The present invention provides a method of reformatting web pages and other text documents displayed on a computer that allows a user who has difficulty reading to (a) navigate between and among such documents and, (b) have such documents (or portions of them) read to him or her (in their original or translated form) while preserving to a large extent the original layout of the document. The invention implements a "point-and-read" paradigm, whereby the user indicates the text to be read by moving a mouse (or pointer device) over the icon or text. (In other instances, the indication occurs by clicking on an icon or text.) Hyperlink navigation and other program functions are accomplished in a similar manner.

BRIEF DESCRIPTION OF THE DRAWINGS

The above summary, as well as the following detailed description of a preferred embodiment of the invention, will be better understood when read in conjunction with the following drawings. For the purpose of illustrating the invention, there is shown in the drawings an embodiment that is presently preferred, and an example of how the invention is used in a real-world project. It should be understood that the invention is not limited to the precise arrangements and instrumentalities shown. In the drawings.

DETAILED DESCRIPTION OF THE INVENTION

Figure 1:
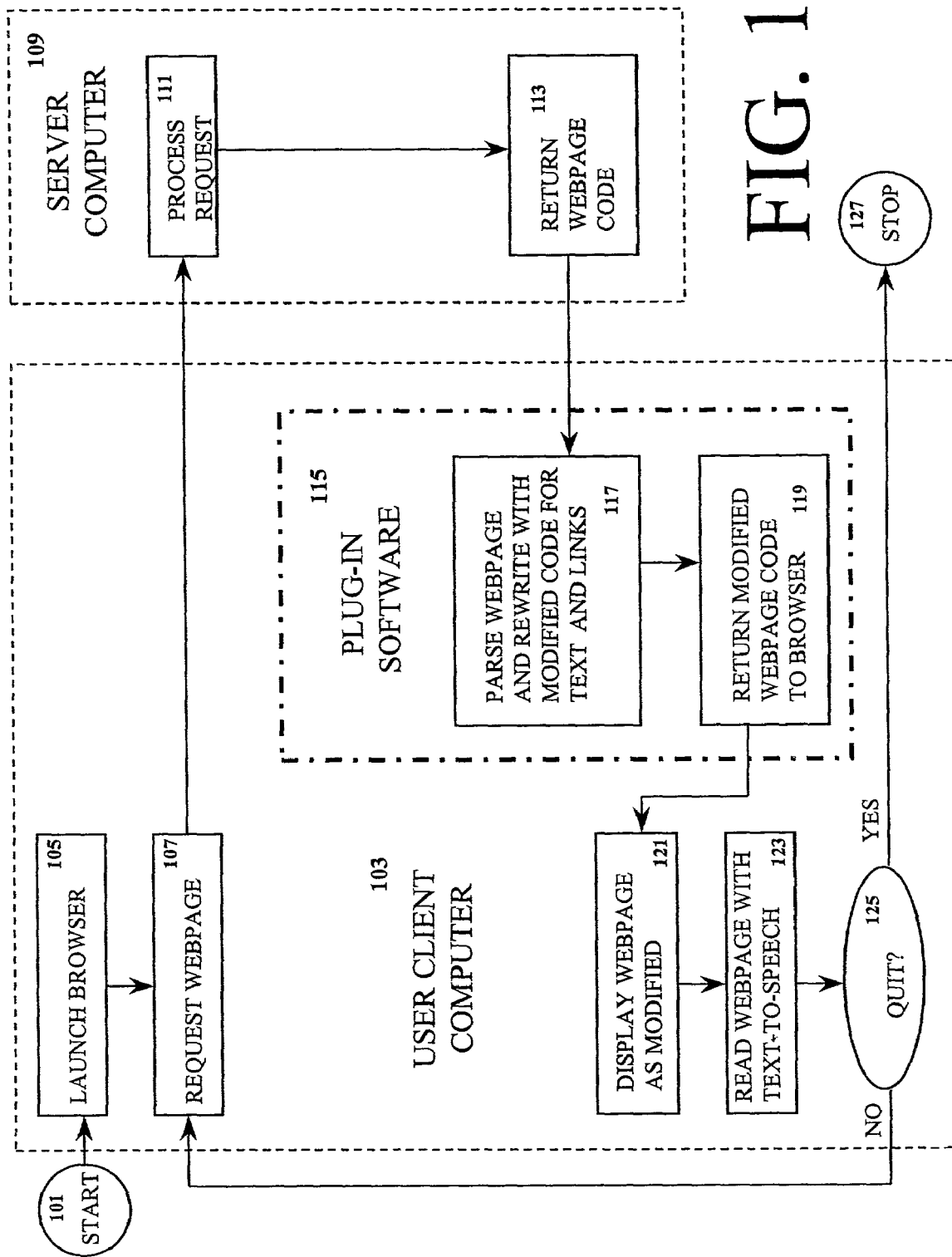
FIG. 1 shows a flow chart of a preferred embodiment of the present invention.

Certain terminology is used herein for convenience only and is not to be taken as a limitation on the present invention.

In the drawings, the same reference letters are employed for designating the same elements throughout the several figures.

1. Overview of Present Invention

A preferred embodiment of the present invention takes one web page which would ordinarily be displayed in a browser window in a certain manner ("WEBPAGE 1") and displays that page in a new but similar manner ("WEBPAGE 2"). The new format contains additional hidden code which enables the web page to be easily read aloud to the user by text-to-speech software.

The present invention reads the contents of WEBPAGE 1 (or more particularly, parses its HTML code) and then "on-the-fly" in real time creates the code to display WEBPAGE 2, in the following manner:

(1) All standard text (i.e., sentence or phrase) that is not within link tags is placed within link tags to which are added an "onMouseover" event. The onMouseover event executes a JavaScript function which causes the text-to-speech reader to read aloud the contents within the link tags, when the user places the pointing device (mouse, wand, etc.) over the link. Font tags are also added to the sentence (if necessary) so that the text is displayed in the same color as it would be in WEBPAGE 1—rather than the hyperlink colors (default, active or visited hyperlink) set for WEBPAGE 1. Consequently, the standard text will appear in the same color and font on WEBPAGE 2 as on WEBPAGE 1, with the exception that in WEBPAGE 2, the text will be underlined.

(2) All hyperlinks and buttons which could support an onMouseover event, (but do not in WEBPAGE 1 contain an onMouseover event) are given an onMouseover event. The onMouseover event executes a JavaScript function which causes the text-to-speech reader to read aloud the text within the link tags or the value of the button tag, when the user places the pointing device (mouse, wand, etc.) over the link. Consequently, this type of hyperlink appears the same on WEBPAGE 2 as on WEBPAGE 1.

(3) All buttons and hyperlinks that do contain an onMouseover event are given a substitute onMouseover event. The substitute onMouseover event executes a JavaScript function which first places text that is within the link (or the value of the button tag) into the queue to be read by the text-to-speech reader, and then automatically executes the original onMouseover event coded into WEBPAGE 1. Consequently, this type of hyperlink appears the same on WEBPAGE 2 as on WEBPAGE 1.

(4) All hyperlinks and buttons are preceded by an icon placed within link tags. These link tags contain an onMouseover event. This onMouseover event will execute a JavaScript function that triggers the following hyperlink or button.

In other words, if a user places a pointer (e.g., mouse or wand) over the icon, the browser acts as if the user had clicked the subsequent link or button.

As is evident to those skilled in the art, WEBPAGE 2 will appear almost identical to WEBPAGE 1 except all standard text will be underlined, and there will be small icons in front of every link and button. The user can have any sentence, link or button read to him by moving the pointing device over it. This allows two classes of disabled users to access the web page, those who have difficulty reading, and those with dexterity impairments that prevent them from "clicking" on objects.

In many implementations of JavaScript, for part (3) above, both the original onMouseover function call (as in WEBPAGE 1) and the new onMouseover function call used in part (2) can be placed in the same onMouseover handler. For example, if a link in WEBPAGE 1 contained the text "Buy before lightning strikes" and a picture of clear skies, along with the code onMouseOver="ShowLightning( )"

which makes lightning flash in the sky picture, WEBPAGE 2 would contain the code onMouseOver="CursorOver('Buy before lightning strikes.'); ShowLightning ( );"

The invention avoids conflicts between function calls to the computer sound card in several ways. No conflict arises if both function calls access Microsoft Agent, because the two texts to be "spoken" will automatically be placed in separate queues. If both functions call the sound card via different software applications and the sound card has multi-channel processing (such as ESS Maestro2E), both software applications will be heard simultaneously. Alternatively, the two applications can be queued (one after another) via the coding that the present invention adds to WEBPAGE 2. Alternatively, a plug-in is created that monitors data streams sent to the sound card. These streams are suppressed at user option. For example, if the sound card is playing streaming audio from an Internet "radio" station, and this streaming conflicts with the text-to-speech synthesis, the streaming audio channel is automatically muted (or softened).

In an alternative embodiment, the href value is omitted from the link tag for text (part 1 above). (The href value is the address or URL of the web page to which the browser navigates when the user clicks on a link.) In browsers, such as Microsoft's Internet Explorer, the text in WEBPAGE 2 retains the original font color of WEBPAGE 1 and is not underlined. Thus, WEBPAGE 2 appears even more like WEBPAGE 1.

In an alternative embodiment, a new HTML tag is created that functions like a link tag, except that the text is not underlined. This new tag is recognized by the new built in routines. WEBPAGE 2 appears very much like WEBPAGE 1.

In an alternate embodiment, when the onMouseover event is triggered, the text that is being read appears in a different color, or appears as if highlighted with a Magic Marker (i.e., the color of the background behind that text changes) so that the user knows visually which text is being read. When the mouse is moved outside of this text, the text returns to its original color. In an alternate embodiment, the text does not return to its original color but becomes some other color so that the user visually can distinguish which text has been read and which has not. This is similar to the change in color while a hyperlink is being made active, and after it has been activated. In some embodiments these changes in color and appearance are effected by Cascading Style Sheets.

An alternative embodiment eliminates the navigation icon (part 4 above) placed before each link. Instead, the onMouseover event is written differently, so that after the text-to-speech software is finished reading the link, a timer will start. If the cursor is still on the link after a set amount of time (such as 2 seconds), the browser will navigate to the href URL of the link (i.e., the web page to which the link would navigate when clicked in WEBPAGE 1). If the cursor has been moved, no navigation occurs. WEBPAGE 2 appears identical to WEBPAGE 1.

An alternative embodiment substitutes "onClick" events for onMouseover events. This embodiment is geared to those whose dexterity is sufficient to click on objects. In this embodiment, the icons described in (4) above are eliminated.

An alternative embodiment that is geared to those whose dexterity is sufficient to click on objects does not place all text within link tags, but keeps the icons described in (4) in front of each sentence, link and button. The icons do not have onMouseover events, however, but rather onClick events which execute a JavaScript function that causes the text-to-speech reader to read the following sentence, link or button. In this embodiment, clicking on the link or button on WEBPAGE 2 acts the same as clicking on the link or button on WEBPAGE 1.

An alternative embodiment does not have these icons precede each sentence, but only each paragraph. The onClick event associated with the icon executes a JavaScript function which causes the text-to-speech reader to read the whole paragraph. An alternate formulation allows the user to pause the speech after each sentence or to repeat sentences.

An alternative embodiment has the onMouseover event, which is associated with each hyperlink from WEBPAGE 1, read the URL where the link would navigate. A different alternative embodiment reads a phrase such as "When you click on this link it will navigate to a web page at" before reading the URL. In some embodiments, this onMouseover event is replaced by an onClick event.

In an alternative embodiment, the text-to-speech reader speaks nonempty "alt" tags on images. ("Alt" tags provide a text description of the image, but are not necessary code to display the image.) If the image is within a hyperlink on WEBPAGE 1, the onMouseover event will add additional code that will speak a phrase such as "This link contains an image of a" followed by the contents of the alt tag. Stand-alone images with nonempty alt tags will be given onMouseover events with JavaScript functions that speak a phrase such as "This is an image of" followed by the contents of the alt tag.

An alternate implementation adds the new events to the arrays of objects in each document container supported by the browser. Many browsers support an array of images and an array of frames found in any particular document or web page. These are easily accessed by JavaScript (e.g., document.frames[ ] or document.images[ ]). In addition, Netscape 4.0+, supports tag arrays (but Microsoft Internet Explorer does not). In this implementation, JavaScript code then makes the changes to properties of individual elements of the array or all elements of a given class (P,H1,etc.). For example, by writing document.tags.H1.color="blue";

all text contained in <H1> tags turns blue. In this implementation (which requires that the tag array allow access to the hyperlink text as well as the onMouseover event), rather than parsing each document completely and adding HTML text to the document, all changes are made using JavaScript. The internal text in each <A> tag is read, and then placed in new onMouseover handlers. This implementation requires less parsing, so is less vulnerable to error, and reduces the document size of WEBPAGE 2.

In a preferred embodiment of the present invention, the parsing routines are built into a browser, either directly, or as a plug-in, as an applet, as an object, as an add-in, etc. Only WEBPAGE 1 is transmitted over the Internet. In this embodiment, the parsing occurs at the user's client computer or Internet appliance—that is, the browser/plug-in combination gets WEBPAGE 1 from the Internet, parses it, turns it into WEBPAGE 2 and then displays WEBPAGE 2. If the user has dexterity problems, the control objects for the browser (buttons, icons, etc.) are triggered by onMouseover events rather than the onClick or onDoubleClick events usually associated with computer applications that use a graphical interface.

In an alternative embodiment, the user accesses the present invention from a web page with framesets that make the web page look like a browser ("WEBPAGE BROWSER"). One of the frames contains buttons or images that look like the control objects usually found on browsers, and these control objects have the same functions usually found on browsers (e.g., navigation, search, history, print, home, etc.). These functions are triggered by onMouseover events associated with each image or button. The second frame will display web pages in the form of WEBPAGE 2. When a user submits a URL (web page address) to the WEBPAGE BROWSER, the user is actually submitting the URL to a CGI script at a server. The CGI script navigates to the URL, downloads a page such as WEBPAGE 1, parses it on-the-fly, converts it to WEBPAGE 2, and transmits WEBPAGE 2 to the user's computer over the Internet. The CGI script also changes the URLs of links that it parses in WEBPAGE 1. The links call the CGI script with a variable consisting of the originally hyperlink URL. For example, in one embodiment, if the hyperlink in WEBPAGE 1 had an href=http://www.nytimes.com and the CGI script was at http://www.simtalk.com/cgi-bin/webreader.pl, then the href of the hyperlink in WEBPAGE 2 reads href=http//www.simtalk.com/cgi-bin/ webreader.pl?originalUrl=www.nytimes.com. When the user activates this link, it invokes the CGI script and directs the CGI script to navigate to the hyperlink URL for parsing and modifying. This embodiment uses more Internet bandwidth than when the present invention is integrated into the browser, and greater server resources. However, this embodiment can be accessed from any computer hooked to the Internet. In this manner, people with disabilities do not have to bring their own computers and software with them, but can use the computers at any facility. This is particularly important for less affluent individuals who do not have their own computers, and who access the Internet using public facilities such as libraries.

An alternative embodiment takes the code from the CGI script and places it in a file on the user's computer (perhaps in a different computer programming language). This embodiment then sets the home page of the browser to be that file. The modified code for links then calls that file on the user's own computer rather than a CGI server.

Alternative embodiments do not require the user to place a cursor or pointer on an icon or text, but "tab" through the document from sentence to sentence. Then, a keyboard command will activate the text-to-speech engine to read the text where the cursor is placed. Alternatively, at the user's option, the present invention automatically tabs to the next sentence and reads it. In this embodiment, the present invention reads aloud the document until a pause or stop command is initiated. Again at the user's option, the present invention begins reading the document (WEBPAGE 2) once it has been displayed on the screen, and continues reading the document until stopped or until the document has been completely read.

Alternative embodiments add speech recognition software, so that users with severe dexterity limitations can navigate within a web page and between web pages. In this embodiment, voice commands (such as "TAB RIGHT") are used to tab or otherwise navigate to the appropriate text or link, other voice commands (such as "CLICK" or "SPEAK") are used to trigger the text-to-speech software, and other voice commands activate a link for purposes of navigating to a new web page. When the user has set the present invention to automatically advance to the next text, voice commands (such as "STOP", "PAUSE", "REPEAT", or "RESUME") control the reader.

The difficulty of establishing economically viable Internet-based media services is compounded in the case of services for the disabled or illiterate. Many of the potential users are in lower socioeconomic brackets and cannot afford to pay for software or subscription services. Many Internet services are offered free of charge, but seek advertising or sponsorships. For websites, advertising or sponsorships are usually seen as visuals (such as banner ads) on the websites' pages. This invention offers additional advertising opportunities.

In one embodiment, the present invention inserts multimedia advertisements as interstitials that are seen as the user navigates between web pages and websites. In another embodiment, the present invention "speaks" advertising. For example, when the user navigates to a new web page, the present invention inserts an audio clip, or uses the text-to-speech software to say something like "This reading service is sponsored by Intel." In an alternative embodiment, the present invention recognizes a specific meta tag (or meta tags, or other special tags) in the header of WEBPAGE 1 (or elsewhere). This meta tag contains a commercial message or sponsorship of the reading services for the web page. The message may be text or the URL of an audio message. The present invention reads or plays this message when it first encounters the web page. The web page author can charge sponsors a fee for the message, and the reading service can charge the web page for reading its message. This advertising model is similar to the sponsorship of closed captioning on TV.

Several products, including HELPRead, Browser Buddy, and the above-identified U.S. application Ser. No. 09/974,132, use and teach methods by which a link can be embedded in a web page, and the text-to-speech software can be launched by clicking on that link. In a similar manner, a link can be embedded in a web page which will launch the present invention in its various embodiments. Such a link can distinguish which embodiment the user has installed, and launch the appropriate one.

Text-to-speech software frequently has difficulty distinguishing heterophonic homographs (or isonyms): words that are spelled the same, but sound different. An example is the word "bow" as in "After the archer shoots his bow, he will bow before the king." A text-to-speech engine will usually choose one pronunciation for all instances of the word. A text-to-speech engine will also have difficulty speaking uncommon names or terms that do not obey the usual pronunciation rules. While this is not practical in the text of a document meant to be read, a "dictionary" can be associated with a document which sets forth the phonemes (phonetic spelling) for particular words in the document. In one embodiment of the present invention, a web page creates such a dictionary and signals the dictionary's existence and location via a pre-specified tag, object, function, etc. Then, the present invention will get that dictionary, and when parsing the web page, will substitute the phonetic spellings within the onMouseover events.

The above-identified U.S. application Ser. No. 09/974,132 discloses a method of embedding hidden text captions or commentary on a web page, whereby clicking on an icon or dragging that icon to another window would enable the captions to be read (referred to herein as "spoken captions").

The hidden text could also include other information such as the language in which the caption or web page was written. An alternative embodiment of the present invention uses this information to facilitate real-time on-the-fly translation of the caption or the web page, using the methods taught in the above-identified U.S. application Ser. No. 09/974,132. The text is translated to the language used by the text-to-speech engine.

In an alternative embodiment, the present invention alters the code in the spoken captions as displayed in WEBPAGE 2, so that the commentary is "spoken" by the text-to-speech software when the user places a cursor or pointer over the icon.

In an alternative embodiment of the present invention, a code placed on a web page, such as in a meta tag in the heading of the page, or in the spoken caption icons, identifies the language in which the web page is written (e.g., English, Spanish). The present invention then translates the text of the web page, sentence by sentence, and displays a new web page (WEBPAGE 2) in the language used by the text-to-speech engine of the present invention, after inserting the code that allows the text-to-speech engine to "speak" the text. (This includes the various onMouseover commands, etc.) In an alternate embodiment, the new web page (WEBPAGE 2) is shown in the original language, but the onMouseover commands have the text-to-speech engine read the translated version.

In an alternative embodiment, the translation does not occur until the user places a pointer or cursor over a text passage. Then, the present invention uses the information about what language WEBPAGE 1 is written in to translate that particular text passage on-the-fly into the language of the text-to-speech engine, and causes the engine to speak the translated words.

While the above embodiments have been described as if WEBPAGE 1 were an HTML document, primarily designed for display on the Internet, no such limitation is intended. WEBPAGE 1 also refers to documents produced in other formats that are stored or transmitted via the Internet: including ASCII documents, e-mail in its various protocols, and FTP-accessed documents, in a variety of electronic formats. As an example, the Gutenberg Project contains thousands of books in electronic format, but not HTML. As another example, many web-based e-mail (particularly "free" services such as Hotmail) deliver e-mail as HTML documents, whereas other e-mail programs such as Microsoft Outlook and Eudora, use a POP protocol to store and deliver content. WEBPAGE 1 also refers to formatted text files produced by word processing software such as Microsoft Word, and files that contain text whether produced by spreadsheet software such as Microsoft Excel, by database software such as Microsoft Access, or any of a variety of e-mail and document production software. Alternate embodiments of the present invention "speak" and "read" these several types of documents.

WEBPAGE 1 also refers to documents stored or transmitted over intranets, local area networks (LANs), wide area networks (WANs), and other networks, even if not stored or transmitted over the Internet. WEBPAGE 1 also refers to documents created, stored, accessed, processed or displayed on a single computer and never transmitted to that computer over any network, including documents read from removable discs regardless of where created.

While these embodiments have been described as if WEBPAGE 1 was a single HTML document, no such limitation is intended. WEBPAGE 1 may include tables, framesets, referenced code or files, or other objects.

WEBPAGE 1 is intended to refer to the collection of files, code, applets, scripts, objects and documents, wherever stored, that is displayed by the user's browser as a web page. The present invention parses each of these and replaces appropriate symbols and code, so that WEBPAGE 2 appears similar to WEBPAGE 1 but has the requisite text-to-speech functionality of the present invention.

While these embodiments have been described as if alt values occurred only in conjunction with images, no such limitation is intended. Similar alternative descriptions accompany other objects, and are intended to be "spoken" by the present invention at the option of the user. For example, closed captioning has been a television broadcast technology for showing subtitles of spoken words, but similar approaches to providing access for the disabled have been and are being extended to streaming media and other Internet multi-media technologies. As another example, accessibility advocates desire that all visual media include an audio description and that all audio media include a text captioning system. Audio descriptions, however, take up considerable bandwidth. The present invention takes a text captioning system and with text-to-speech software, creates an audio description on-the-fly.

While these embodiments have been described in terms of using "JavaScript functions" and function calls, no such limitation is intended. The "functions" include not only true function calls but also method calls, applet calls and other programming commands in any programming languages including but not limited to Java, JavaScript, VBscript, etc. The term "JavaScript functions" also includes, but is not limited to, ActiveX controls, other control objects and versions of XML and dynamic HTML.

While these embodiments have been described in terms of reading sentences, no such limitation is intended. At the user's option, the present invention reads paragraphs, or groups of sentences, or even single words that the user points to.

2. Detailed Description (Part One)

FIG. 1 shows a flow chart of a preferred embodiment of the present invention. At the start 101 of this process, the user launches an Internet browser 105, such as Netscape Navigator, or Microsoft Internet Explorer, from his or her personal computer 103 (Internet appliance or interactive TV, etc.). The browser sends a request over the Internet for a particular web page 107. The computer server 109 that hosts the web page will process the request 111. If the web page is a simple HTML document, the processing will consist of retrieving a file. In other instances, for example, when the web page invokes a CGI script or requires data from a dynamic database, the computer server will generate the code for the web page on-the-fly in real time. This code for the web page is then sent back 113 over the Internet to the user's computer 103. There, the portion of the present invention in the form of plug-in software 115, will intercept the web page code, before it can be displayed by the browser. The plug-in software will parse the web page and rewrite it with modified code of the text, links, and other objects as appropriate 117.

After the web page code has been modified, it is sent to the browser 119. There, the browser displays the web page as modified by the plug-in 121. The web page will then be read aloud to the user 123 as the user interacts with it.

After listening to the web page, the user may decide to discontinue or quit browsing 125 in which case the process stops 127. On the other hand, the user may decide not to quit 125 and may continue browsing by requesting a new web page 107. The user could request a new web page by typing it into a text field, or by activating a hyperlink. If a new web page is requested, the process will continue as before.

Figure 2:
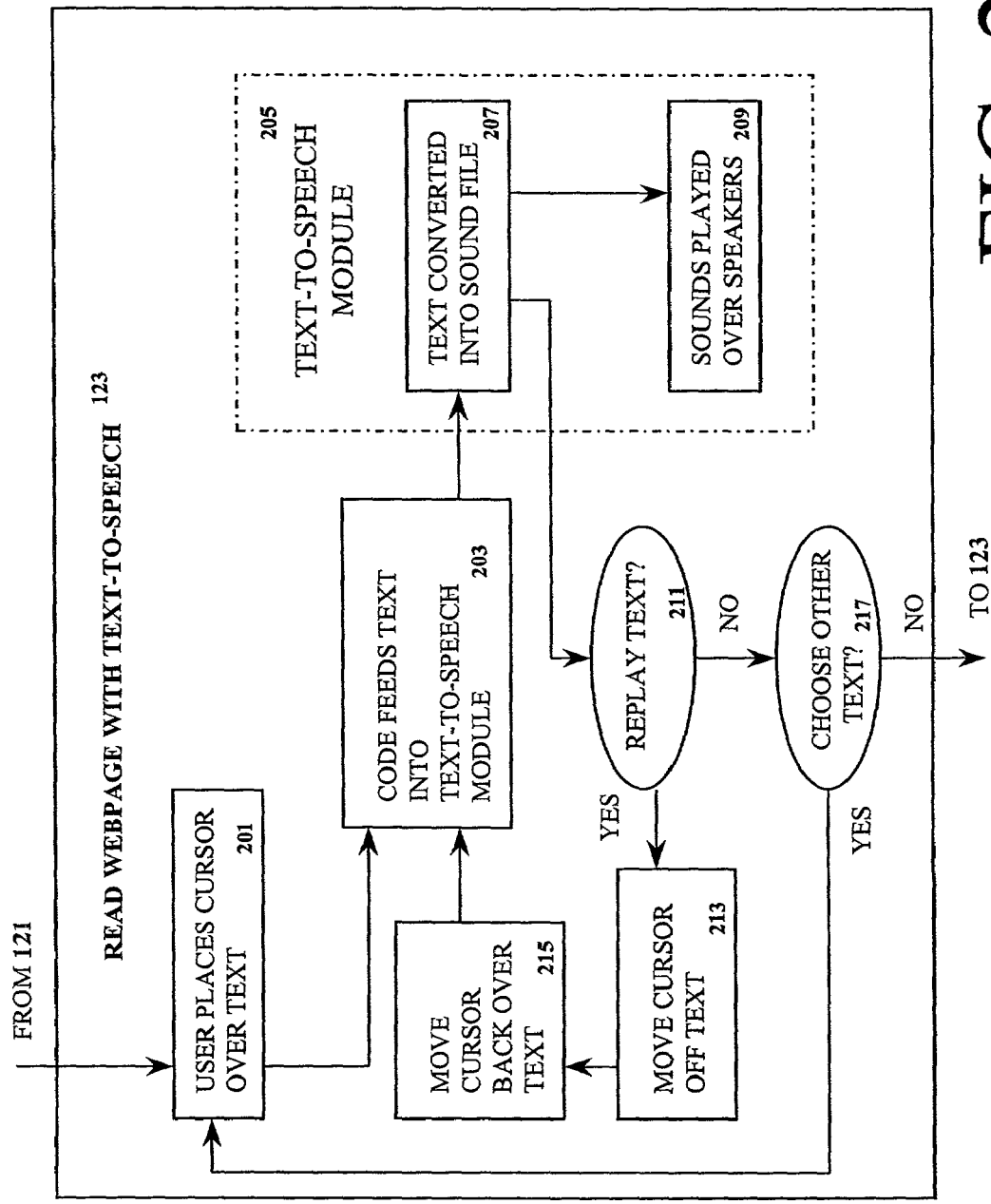
FIG. 2 shows a flow chart of a particular step in FIG. 1, but with greater detail of the sub-steps.

The process of listening to the web page is illustrated in expanded form in FIG. 2. Once the browser displays the web page as modified by the plug-in 121, the user places the cursor of the pointing device over the text which he or she wishes to hear. The code (e.g., JavaScript code placed in the web page by the plug-in software) feeds the text to a text-to-speech module 205 such as DECtalk originally written by Digital Equipment Corporation or TruVoice by Lernout and Hauspie. The text-to-speech module may be a stand-alone piece of software, or may be bundled with other software. For example, the Virtual Friend animation software from Haptek incorporates DECtalk, whereas Microsoft Agent animation software incorporates TruVoice. Both of these software packages have animated "cartoons" which move their lips along with the sounds generated by the text-to-speech software (i.e., the cartoons lip sync the words). Other plug-ins (or similar ActiveX objects) such as Speaks for Itself by DirectXtras, Inc., Menlo Park, Calif., generate synthetic speech from text without animated speakers. In any event, the text-to-speech module 205 converts the text 207 that has been fed to it 203 into a sound file. The sound file is sent to the computers sound card and speakers where it is played aloud 209 and heard by the user.

In an alternative embodiment in which the text-to-speech module is combined or linked to animation software, instructions will also be sent to the animation module, which generate bitmaps of the cartoon lip-syncing the text. The bitmaps are sent to the computer monitor to be displayed in conjunction with the sound of the text being played over the speakers.

In any event, once the text has been "read" aloud, the user must decide if he or she wants to hear it again 211. If so, the user moves the cursor off the text 213 and them moves the cursor back over the text 215. This will again cause the code to feed the text to the text-to-speech module 203, which will "read" it again. (In an alternate embodiment, the user activates a specially designated "replay" button.) If the user does not want to hear the text again, he or she must decide whether to hear other different text on the page 217. If the user wants to hear other text, he or she places the cursor over that text 201 as described above. Otherwise, the user must decide whether to quit browsing 123, as described more fully in FIG. 1 and above.

Figure 3:
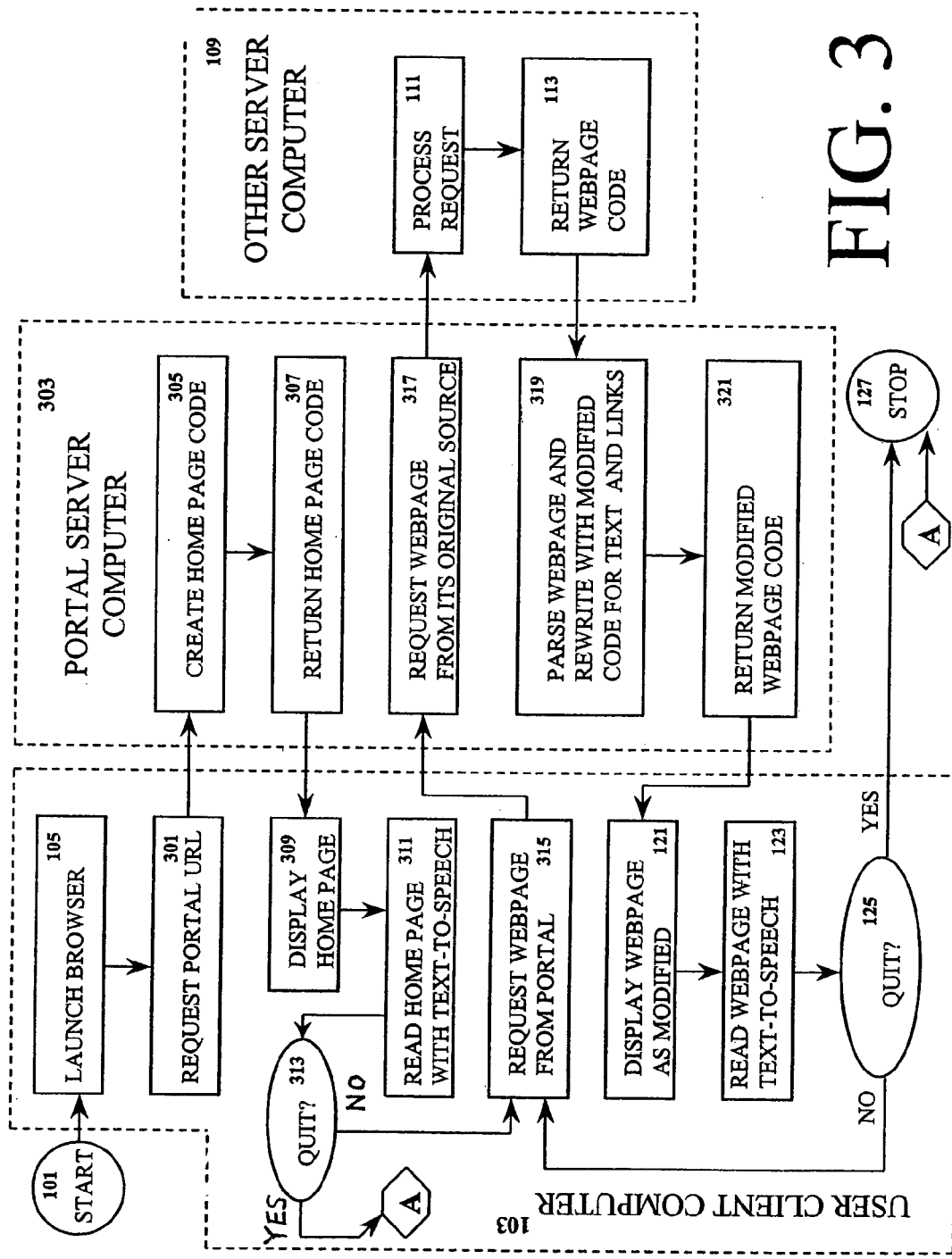
FIG. 3 shows a flow chart of an alternate embodiment of the present invention.

FIG. 3 shows the flow chart for an alternative embodiment of the present invention. In this embodiment, the parsing and modifying of WEBPAGE 1 does not occur in a plug-in (FIG. 1, 115) installed on the user's computer 103, but rather occurs at a website that acts as a portal using software installed in the server computer 303 that hosts the website. In FIG. 3, at the start 101 of this process, the user launches a browser 105 on his or her computer 103. Instead of requesting that the browser navigate to any website, the user then must request the portal website 301. The server computer 303 at the portal website will create the home page 305 that will serve as the WEBBROWSER for the user. This may be simple HTML code, or may require dynamic creation. In any event, the home page code is returned to the user's computer 307, where it is displayed by the browser 309. (In alternate embodiments, the home page may be created in whole or part by modifying the web page from another website as described below with respect to FIG. 3 items 317, 111, 113, 319.)

Figure 4:
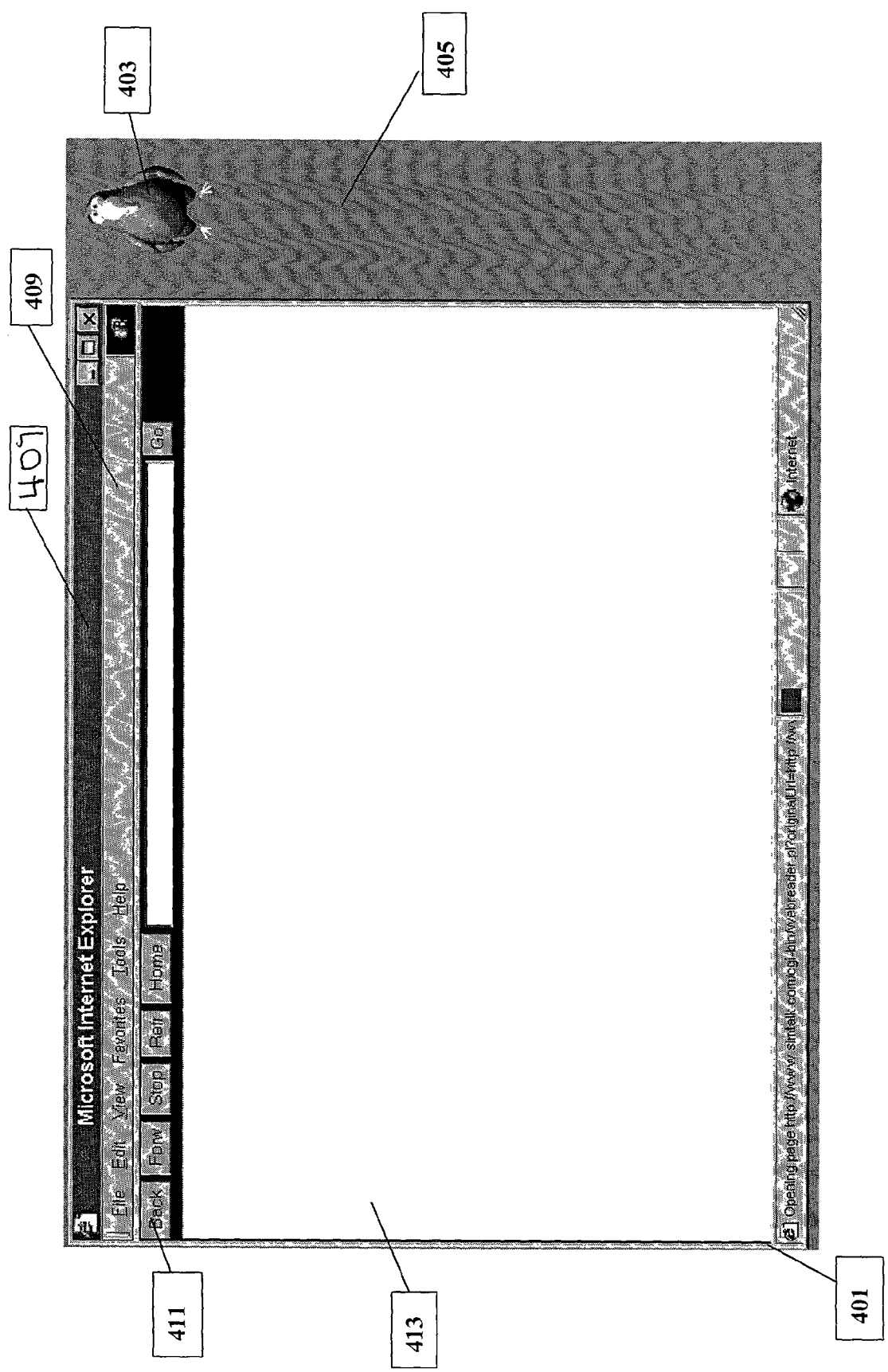
FIG. 4 shows a screen capture of the present invention illustrated in FIG. 3.

An essential part of the home page is that it acts as a "browser within a browser" as shown in FIG. 4. FIG. 4 shows a Microsoft Internet Explorer window 401 (the browser) filling about ¾ of a computer screen 405. Also shown is "Peedy the Parrot" 403, one of the Microsoft Agent animations. The title line 407 and browser toolbar 409 in the browser window 401 are part of the browser. The CGI script has suppressed other browser toolbars. The area 411 that appears to be a toolbar is actually part of a web page. This web page is a frameset composed of two frames: 411 and 413. The first frame 411 contains buttons constructed out of HTML code. These are given the same functionality as a browser's buttons, but contain extra code triggered by cursor events, so that the text-to-speech software reads the function of the button aloud. For example, when the cursor is placed on the "Back" button, the text-to-speech software synthesizes speech that says, "Back." The second frame 413, displays the various web pages to which the user navigates (but after modifying the code).

Returning to frame 411, the header for that frame contains code which allows the browser to access the text-to-speech software. To access Microsoft Agent software, and the Lemout and Hauspie TruVoice text-to-speech software that is bundled with it, "object" tags are placed of the top frame 411.

```
<OBJECT   classid="clsid: ......."
          Id ="AgentControl"
          CODEBASE="#VERSION.........."
</OBJECT>
<OBJECT   classid="clsid: ......."
          Id ="TruVoice"
          CODEBASE="#VERSION.........."
</OBJECT>
```

The redacted code is known to practitioners of the art and is specified by and modified from time to time by Microsoft and Lernout and Hauspie.

The header also contains various JavaScript (or Jscript) code including the following functions "CursorOver", "CursorOut", and "Speak":

```
<SCRIPT LANGUAGE="JavaScript">
<!--
    ..........
    function CursorOver(theText)
    {
        delayedText = theText;
        clearTimeout(delayedTextTimer);
        delayedTextTimer = setTimeout("Speak('" +
          theText + "')", 1000);
    }
    function CursorOut()
    {
        clearTimeout(delayedTextTimer);
        delayedText ="";
    }
    function Speak(whatToSay)
    {
        speakReq = Peedy.Speak(whatToSay);
    }
    ..........
//-->
<SCRIPT>
```

The use of these functions written is more fully understood in conjunction with the code for the "Back" button that appears in frame 411. This code references functions known to those skilled in the art, which cause the browser to retrieve the last web page shown in frame 413 and display that page again in frame 413. In this respect the Back" button acts like a typical browser "Back" button. In addition, however, the code for the "Back" button contains the following invocations of the "CursorOver" and "CursorOut" functions.

```
<INPUT   TYPE=button   NAME="BackButton"
Value="Back"
. . .
    onMouseOver="CursorOver('Back')"
onMouseOut="CursorOut( )">
```

When the user moves the cursor over the "Back" button, the onMouseover event triggers the CursorOver function. This function places the text "Back" into the "delayedText" variable and starts a timer. After 1 second, the timer will "timeout" and invoke the Speak function. However, if the user moves the cursor off the button before timeout occurs (as with random "doodling" with the cursor), the onMouseout event triggers the CursorOut function, which cancels the Speak function before it can occur. When the Speak function occurs, the "delayedText" variable is sent to Microsoft Agent, the "Peedy.Speak( . . . )" command, which causes the text-to-speech engine to read the text.

In this embodiment, the present invention will alter the HTML of WEBPAGE 1 as follows, before displaying it as WEBPAGE 2 in frame 413. Consider a news headline on the home page followed by an underlined link for more news coverage.

EARTHQUAKE SEVERS UNDERSEA CABLES. For more details click here.

The standard HTML for these two sentences as found in WEBPAGE 1 would be:

<P>EARTHQUAKE SEVERS UNDERSEA CABLES.
<A href="www.nytimes.com/quake54.html">For more details click here.</A></P>

The "P" tags indicate the start and end of a paragraph, whereas the "A" tags indicate the start and end of the hyperlink, and tell the browser to underline the hyperlink and display it in a different color font. The "href" value tells the browser to navigate to a specified web page at the New York Times (www.nytimes.com/quake54.html), which contains more details.

The preferred embodiment of the present invention will generate the following code for WEBPAGE 2:

<P><A
  onMouseOver="window.top.frame.SimtalkFrame.
    CursorOver('EARTHQUAKE SEVERS UNDERSEA CABLES.')"
  onMouseOut="window.top.frames.SimTalkFrame.
    CursorOut( )">EARTHQUAKE SEVERS UNDERSEA CABLES.</A>
<A   href="http://www.simtalk.com/cgi-bin/
    webreader.pl?originalUrl=www.nytimes.com/
    quake54.html"
  onMouseOver="window.top.frame.SimtalkFrame.
    CursorOver('For more details click here.')"
  onMouseOut="window.top.frames.SimTalkFrame.
    CursorOut( )">For more details click here.</A></P>

When this HTML code is displayed in either Microsoft's Internet Explorer, or Netscape Navigator, it (i.e., WEBPAGE 2) will appear identical to WEBPAGE 1.

Alternatively, instead of the <A> tag (and its </A> complement), the present invention substitutes a <SPAN> tag (and </SPAN> complement). To make the sentence change color (font or background) while being read aloud, the variable "this" is added to the argument of the function call CursorOver and CursorOut. These functions can then access the color and background properties of "this" and change the font style on-the-fly.

As with the "Back" button in frame 411, (and as known to those skilled in the art) when the user places the cursor over either the sentence or the link, and does not move the cursor off that sentence or link, then the MouseOver event will cause the speech synthesis engine to "speak" the text in the CursorOver function. The "window.top.fram.Simtalk-Frame" is the naming convention that tells the browser to look for the CursorOver or CursorOut function in the frame 411.

The home page is then read by the text-to-speech software 311. This process is not shown in detail, but is identical to the process detailed in FIG. 2.

Figure 5:
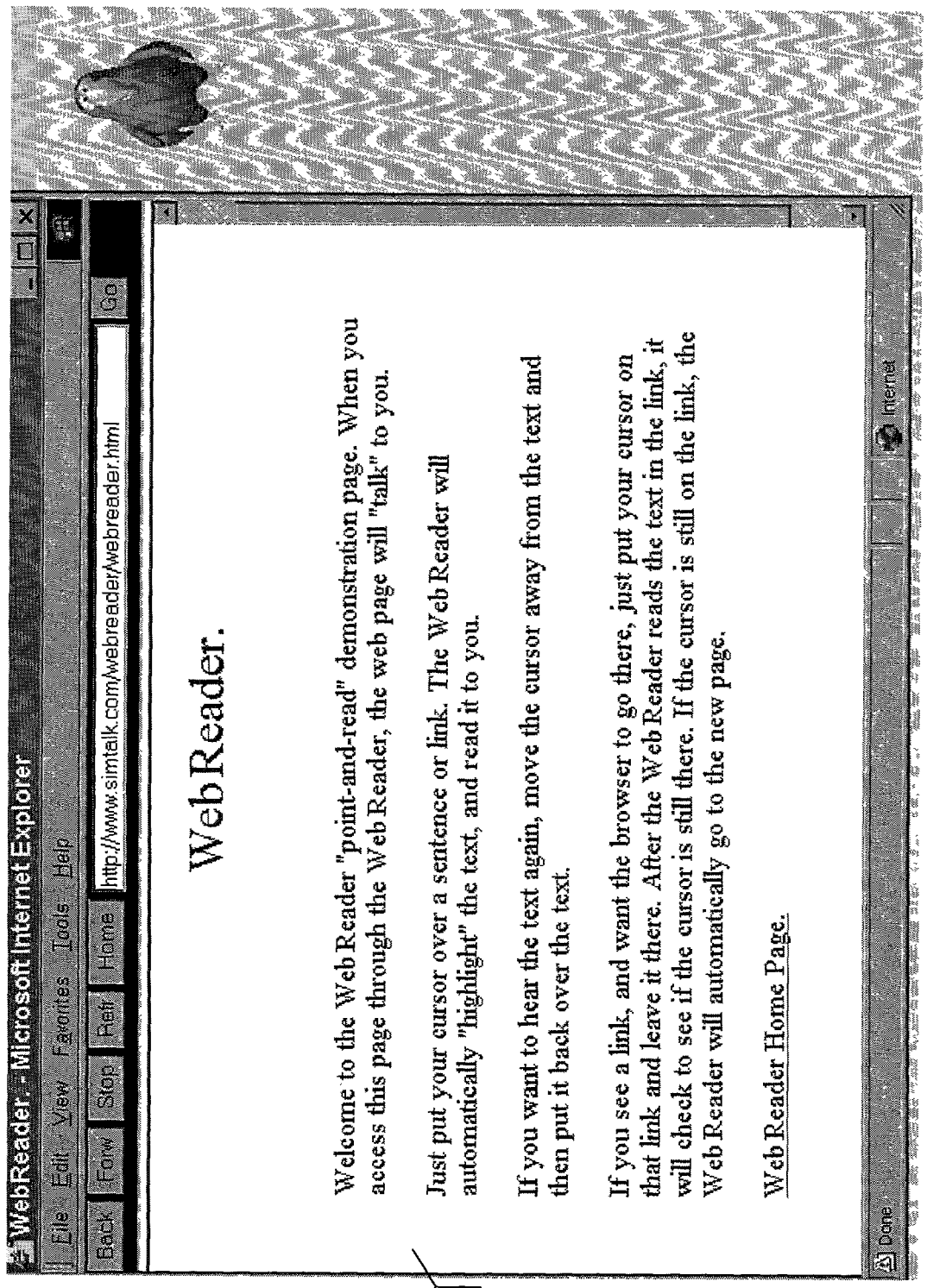
FIG. 5 shows a screen capture of the present invention displaying a particular web page with modified formatting, after having navigated to the particular web page from the FIG. 3 screen.

An example of a particular web page (or home page) is shown in FIG. 5. This is the same as FIG. 4, except that a particular web page has been loaded into the bottom frame 413.

Figure 6:
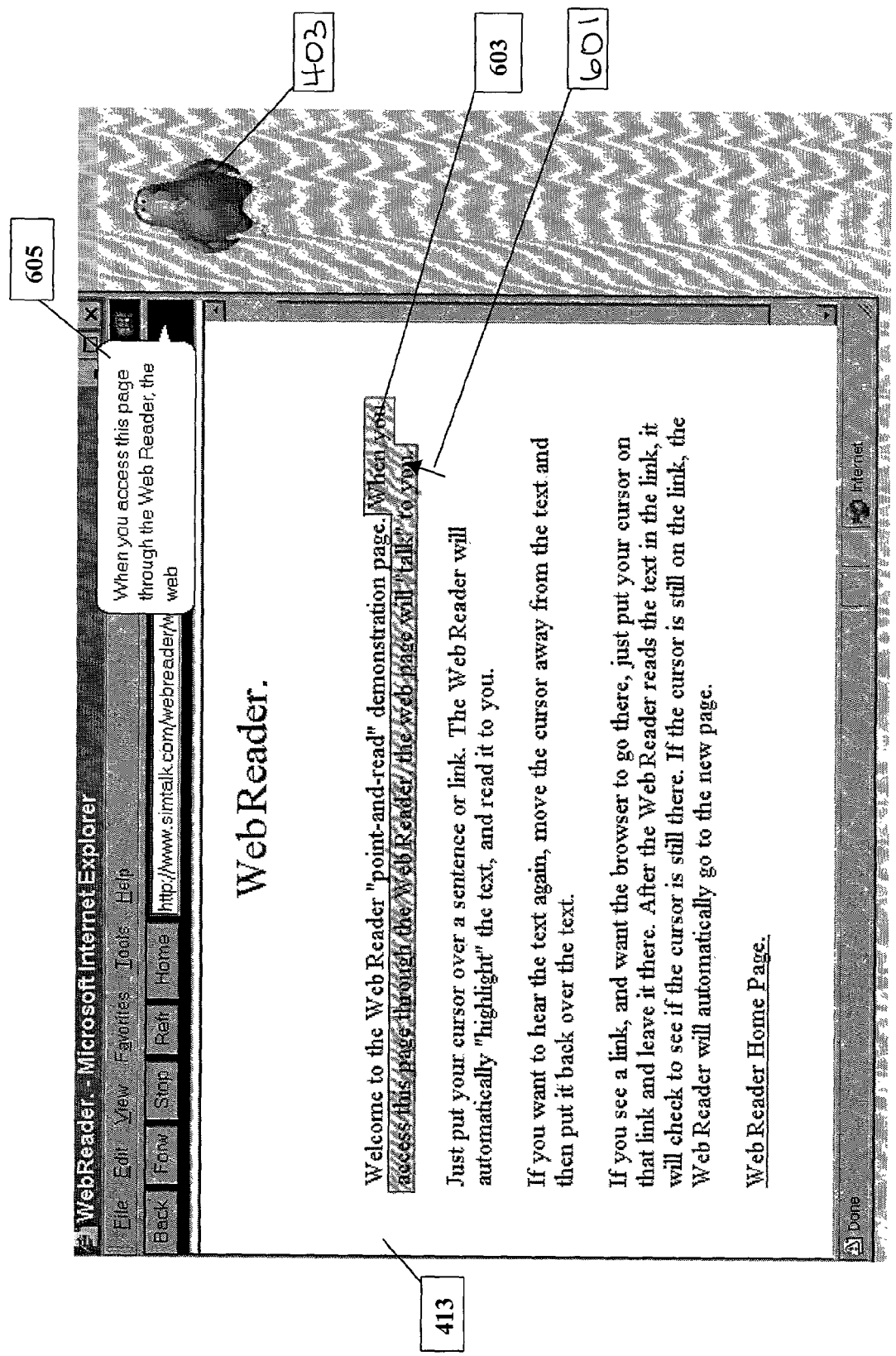
FIG. 6 shows a screen capture of the present invention after the user has placed the cursor over a sentence in the web page shown in FIG. 5.

Referring to FIG. 6, when the user places the cursor 601 over a particular sentence 603 ("When you access this page through the web Reader, the web page will "talk" to you."), the sentence is highlighted. If the user keeps the cursor on the highlighted sentence, the text-to-speech engine "reads" the words in synthesized speech. In this embodiment (which uses Microsoft Agent), the animated character Peedy 403, appears to speak the words. In addition, Microsoft Agent generates a "word balloon" 605 that displays each word as it is spoken. In FIG. 6, the screen capture has occurred while Peedy 403 is halfway through speaking the sentence 603.

The user may then quit 313, in which case the process stops 127, or the user may request a web page 315, e.g., by typing it in, activating a link, etc. However, this web page is not requested directly from the computer server hosting the web page 109. Rather, the request is made of a CGI script at the computer hosting the portal 303. The link in the home page contains the information necessary for the portal server computer to request the web page from its host. As seen in the sample code, the URL for the "For more details click here." link is not "www.nytimes.com/quake54.html" as in WEBPAGE 1, but rather "http://www.simtalk.com/cgi-bin/webreader.pl?originalUrl=www.nytimes.com/quake54.html". Clicking on this link will send the browser to the CGI script at simtalk.com, which will obtain and parse the web page at "www.nytimes.com/quake54.html", add the code to control the text-to-speech engine, and send the modified code back to the browser.

As restated in terms of FIG. 3, when this web page request 315 is received by the portal server computer, the CGI script requests the web page which the user desires 317 from the server hosting that web page 109. That server processes the request 111 and returns the code of the web page 113 to the portal server 303. The portal server parses the web page code and rewrites it with modified code (as described above) for text and links 319.

After the modifications have been made, the modified code for the web page is returned 321 to the user's computer 103 where it is displayed by the browser 121 The web page is then read using the text-to-speech module 123, as more fully illustrated and described in FIG. 2. After the web page has been read, the user may request a new web page from the portal 315 (e.g., by activating a link, typing in a URL, etc.). Otherwise, the user may quit 125 and stop the process 127.

2. Detailed Description (Part Two)—Additional Exemplary Embodiment

A. Translation to Clickless Point and Read Version

Another example is shown of the process for translating an original document, such as a web page, to a text-to-speech enabled web page. The original document, here a web page, is defined by source code that includes text which is designated for display. Broadly stated, the translation process operates as follows:

1. The text of the source code that is designated for display (as opposed to the text of the source code that defines non-displayable information) is parsed into one or more grammatical units. In one preferred embodiment of the present invention, the grammatical units are sentences. However, other grammatical units may be used, such as words or paragraphs.

2. A tag is associated with each of the grammatical units. In one preferred embodiment of the present invention, the tag is a span tag, and, more specifically, a span ID tag.

3. An event handler is associated with each of the tags. An event handler executes a segment of a code based on certain events occurring within the application, such as onLoad or onClick. JavaScript event handers may be interactive or non-interactive. An interactive event handler depends on user interaction with the form or the document. For example, onMouseOver is an interactive event handler because it depends on the user's action with the mouse.

The event handler used in the preferred embodiment of the present invention invokes text-to-speech software code. In the preferred embodiment of the present invention, the event handler is a MouseOver event, and, more specifically, an onMouseOver event. Also, in the preferred embodiment of the present invention, additional code is associated with the grammatical unit defined by the tag so that the MouseOver event causes the grammatical unit to be highlighted or otherwise made visually discernable from the other grammatical units being displayed. The software code associated with the event handler and the highlighting (or equivalent) causes the highlighting to occur before the event handler invokes the text-to-speech software code. The highlighting feature may be implemented using any suitable conventional techniques.

4. The original web page source code is then reassembled with the associated tags and event handlers to form text-to-speech enabled web page source code. Accordingly, when an event associated with an event handler occurs during user interaction with a display of a text-to-speech enabled web page, the text-to-speech software code causes the grammatical unit associated with the tag of the event handler to be automatically spoken.

If the source code includes any images designated for display, and if any of the images include an associated text message (typically defined by an alternate text or "alt" attribute, e.g., alt="text message"), then in step 3, an event handler that invokes text-to-speech software code is associated with each of the images that have an associated text message. In step 4, the original web page source code is reassembled with the image-related event handlers. Accordingly, when an event associated with an image-related event handler occurs during user interaction with an image in a display of a text-to-speech enabled web page, the text-to-speech software code causes the associated text message of the image to be automatically spoken.

The user may interact with the display using any type of pointing device, such as a mouse, trackball, light pen, joystick, or touchpad (i.e., digitizing tablet). In the process described above, each tag has an active region and the event handler preferably delays invoking the text-to-speech software code until the pointing device persists in the active region of a tag for greater than a human perceivable preset time period, such as about one second. More specifically, in response to a mouseover event, the grammatical unit is first immediately (or almost immediately) highlighted. Then, if the mouseover event persists for greater than a human perceivable preset time period, the text-to-speech software code is invoked. If the user moves the pointing device away from the active region before the preset time period, then the text is not spoken and the highlighting disappears.

In one preferred embodiment of the present invention, the event handler invokes the text-to-speech software code by calling a JavaScript function that executes text-to-speech software code.

If a grammatical unit is a link having an associated address (e.g., a hyperlink), a fifth step is added to the translation process. In the fifth step, the associated address of the link is replaced with a new address that invokes a software program which retrieves the source code at the associated address and then causing steps 1–4, as well as the fifth step, to be repeated for the retrieved source code. Accordingly, the new address becomes part of the text-to-speech enabled web page source code. In this manner, the next web page that is retrieved by selecting on a link becomes automatically translated without requiring any user action. A similar process is performed for any image-related links.

B. Clickless Browser

A conventional browser includes a navigation toolbar having a plurality of button graphics (e.g., back, forward), and a web page region that allows for the display of web pages. Each button graphic includes a predefined active region. Some of the button graphics may also include an associated text message (defined by an "alt" attribute) related to the command function of the button graphic. However, to invoke a command function of the button graphic in a conventional browser, the user must click on its active region.

In one preferred embodiment of the present invention, a special browser is preferably used to view and interact with the translated web page. The special browser has the same elements as the conventional browser, except that additional software code is included to add event handlers that invoke text-to-speech software code for automatically speaking the associated text message and then executing the command function associated with the button graphic. Preferably, the command function is executed only if the event (e.g., mouseover event) persists for greater than a preset time period, in the same manner as described above with respect to the grammatical units. Upon detection of the mouseover event, the special browser immediately (or almost immediately) highlights the button graphic and invokes the text-to-speech software code for automatically speaking the associated text message. Then, if the mouseover event persists for greater than a human perceivable preset time period, the command function associated with the button graphic is executed. If the user moves the pointing device away from the active region of the button graphic before the preset time period, then the command function associated with the button graphic is not executed and the highlighting disappears.

C. Point and Read Process

The point and read process for interacting with translated web pages is preferably implemented in the environment of the special browser so that the entire web page interaction process may be clickless. In the example described herein, the grammatical units are sentences, the pointing device is a mouse, and the human perceivable preset time period is about one second.

A user interacts with a web page displayed on a display device. The web page includes one or more sentences, each being defined by an active region. A mouse is positioned over an active region of a sentence which causes the sentence to be automatically highlighted, and automatically loaded into a text-to-speech engine and thereby automatically spoken. This entire process occurs without requiring any further user manipulation of the pointing device or any other user interfaces associated with display device. Preferably, the automatic loading into the text-to-speech engine occurs only if the pointing device remains in the active region for greater than one second. However, in certain instances and for certain users, the sentence may be spoken without any human perceivable delay.

A similar process occurs with respect to any links on the web page, specifically, links that have an associated text message. If the mouse is positioned over the link, the link is automatically highlighted, the associated text message is automatically loaded into a text-to-speech engine and immediately spoken, and the system automatically navigates to the address of the link. Again, this entire process occurs without requiring any further user manipulation of the mouse or any other user interfaces associated with display device. Preferably, the automatic navigation occurs only if the mouse persists over the link for greater than about one second. However, in certain instances and for certain users, automatic navigation to the linked address may occur without any human perceivable delay. In an alternative embodiment, a human perceivable delay, such as one second, is programmed to occur after the link is highlighted, but before the associated text message is spoken. If the mouse moves out of the active region of the link before the end of the delay period, then the text message is not spoken (and also, no navigation to the address of the link occurs).

A similar process occurs with respect to the navigation toolbar of the browser. If the mouse is positioned over an active region of a button graphic, the button graphic is automatically highlighted, the associated text message is automatically loaded into a text-to-speech engine and immediately spoken, and the command function of the button graphic is automatically initiated. Again, this entire process occurs without requiring any further user manipulation of the mouse or any other user interfaces associated with display device. Preferably, the command function is automatically initiated only if the mouse persists over the active region of the button graphic for greater than about one second. However, in certain instances and for certain users, the command function may be automatically initiated without any human perceivable delay. In an alternative embodiment, a human perceivable delay, such as one second, is programmed to occur after the button graphic is highlighted, but before the associated text message is spoken. If the mouse moves out of the active region of the button graphic before the end of the delay period, then the text message is not spoken (and also, the command function of the button graphic is not initiated). In another alternative embodiment, such as when the button graphic is a universally understood icon designating the function of the button, there is no associated text message. Accordingly, the only actions that occur are highlighting and initiation of the command function.

D. Illustration of Additional Exemplary Embodiment

Figure 7:
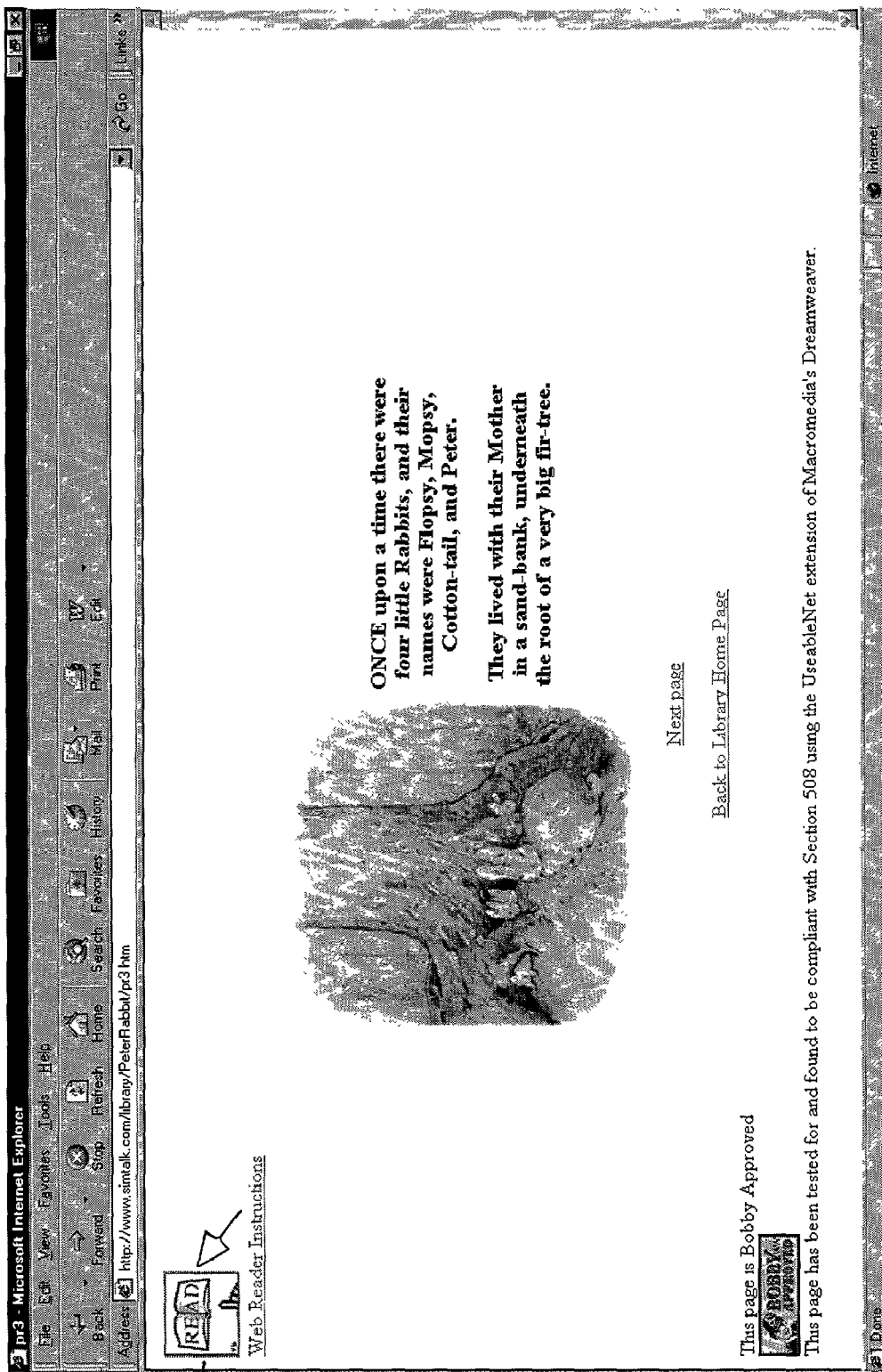
FIGS. 7–13 show screen captures of another preferred embodiment of the present invention.

FIG. 7 shows an original web page as it would normally appear using a conventional browser, such as Microsoft Internet Explorer. In this example, the original web page is a page from a storybook entitled "The Tale of Peter Rabbit," by Beatrix Potter. To initiate the translation process, the user clicks on a Point and Read Logo 400 which has been placed on the web page by the web designer. Alternatively, the Point and Read Logo itself may be a clickless link, as is well-known in the prior art.

Figure 8:
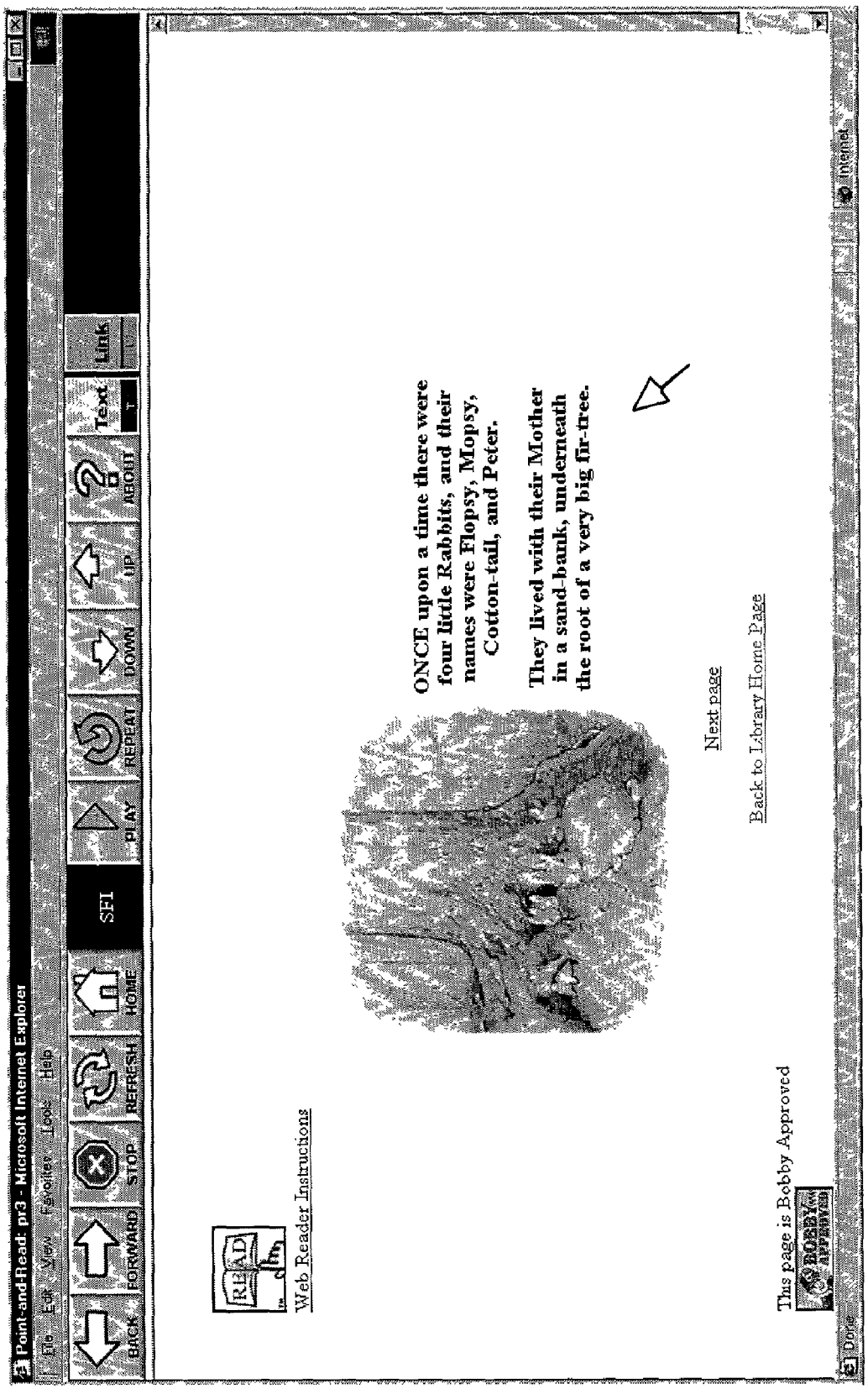

FIG. 8 shows a translated text-to-speech enabled web page. The visual appearance of the of the text-to-speech enabled web page is identical to the visual appearance of the original web page. The conventional navigation toolbar, however, has been replaced by a point and read/navigate toolbar. In this example, the new toolbar allows the user to execute the following commands: back, forward, down, up, stop, refresh, home, play, repeat, about, text (changes highlighting color from yellow to blue at user's discretion if yellow does not contrast with the background page color), and link (changes highlighting color of links from cyan to green at the user's discretion if cyan does not contrast with the background page color). Preferably, the new toolbar also includes a window (not shown) to manually enter a location or address via a keyboard or dropdown menu, as provided in conventional browsers.

Figure 9:
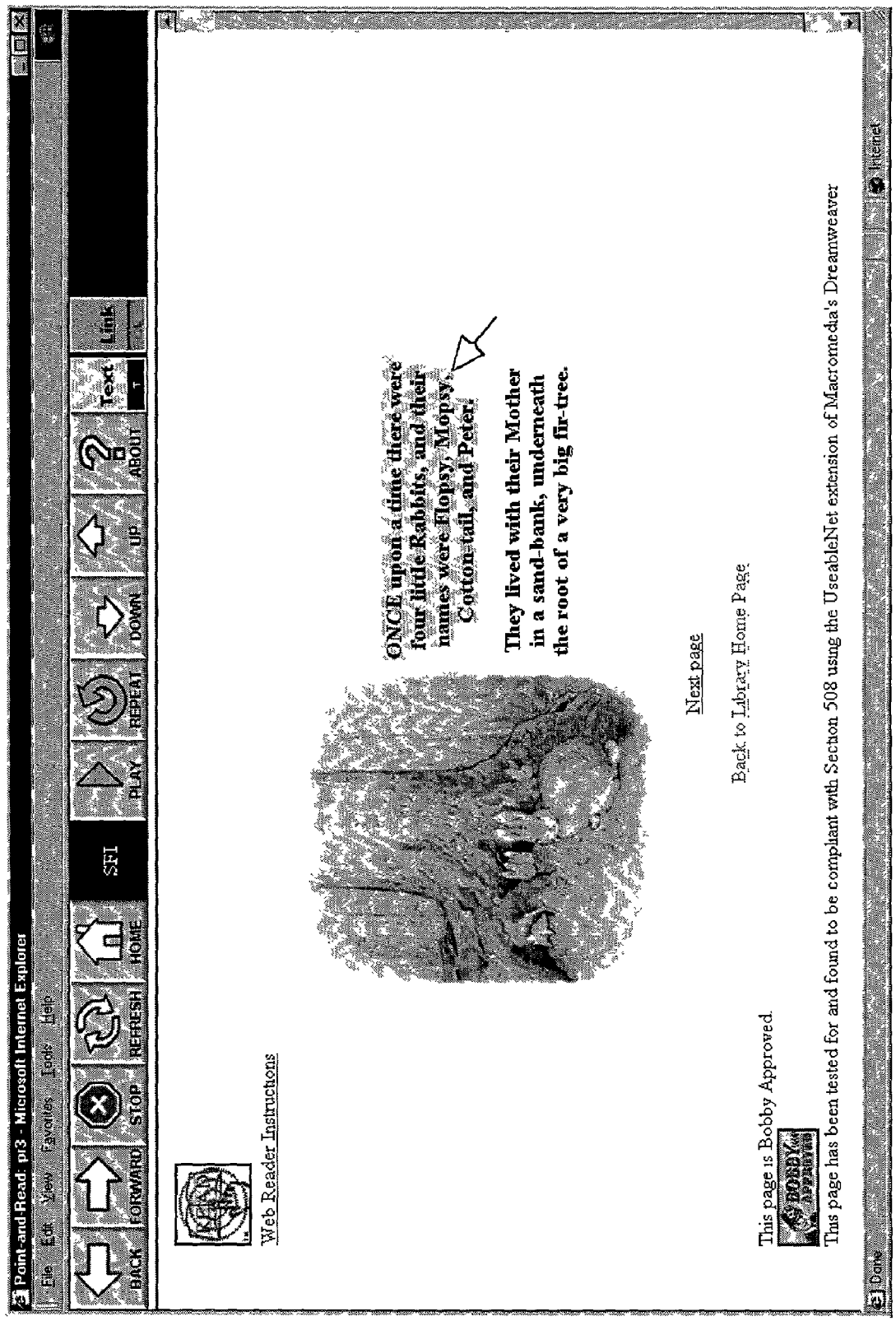

FIG. 9 shows the web page of FIG. 8 wherein the user has moved the mouse to the active region of the first sentence, "ONCE upon a time . . . and Peter." The entire sentence becomes highlighted. If the mouse persists in the active region for a human perceivable time period, the sentence will be automatically spoken.

Figure 10:
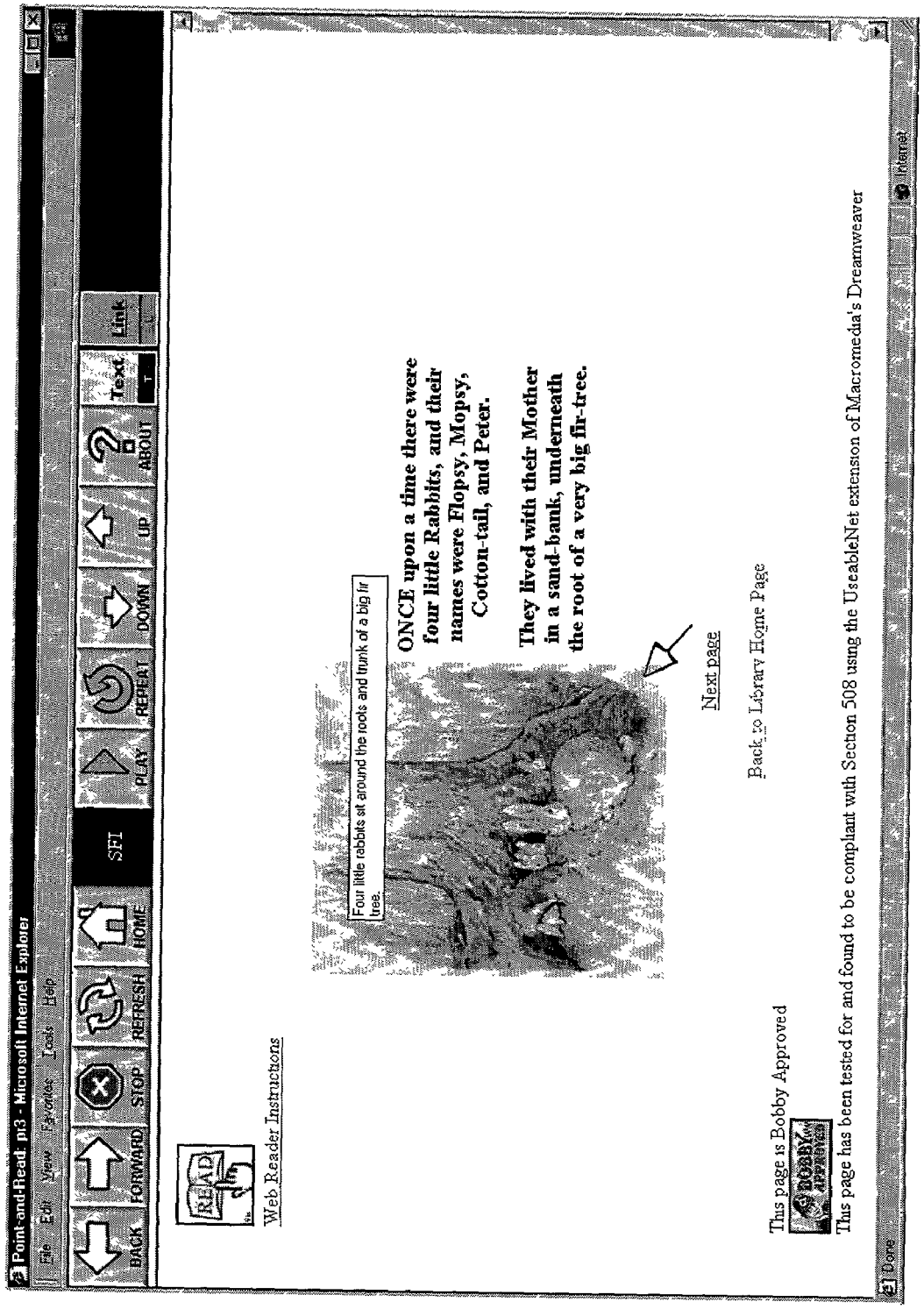

FIG. 10 shows the web page of FIG. 8 wherein the user has moved the mouse to the active region of the story graphics image. The image becomes highlighted and the associated text (i.e., alternate text), "Four little rabbits . . . fir tree," becomes displayed. If the mouse persists in the active region of the image for a human perceivable time period, the associated text of the image (i.e., the alternate text) is automatically spoken.

Figure 11:
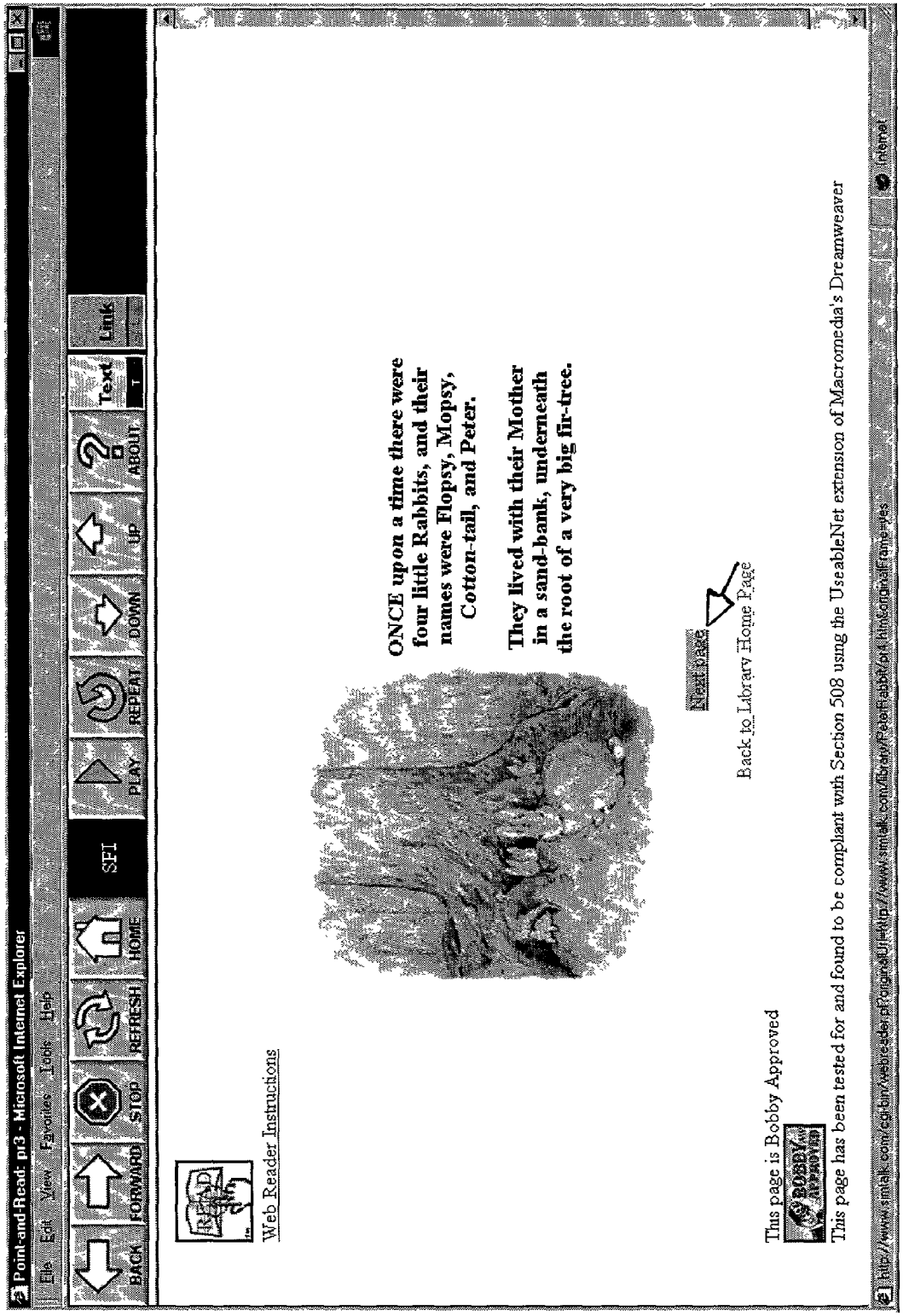

FIG. 11 shows the web page of FIG. 8 wherein the user has moved the mouse to the active region of the "Next Page" link. The link becomes highlighted using any suitable conventional processes. However, in accordance with the present invention, the associated text of the image (i.e., the alternate text) is automatically spoken. If the mouse remains over the link for a human perceivable time period, the browser will navigate to the address associated with the "Next Page" link.

Figure 12:
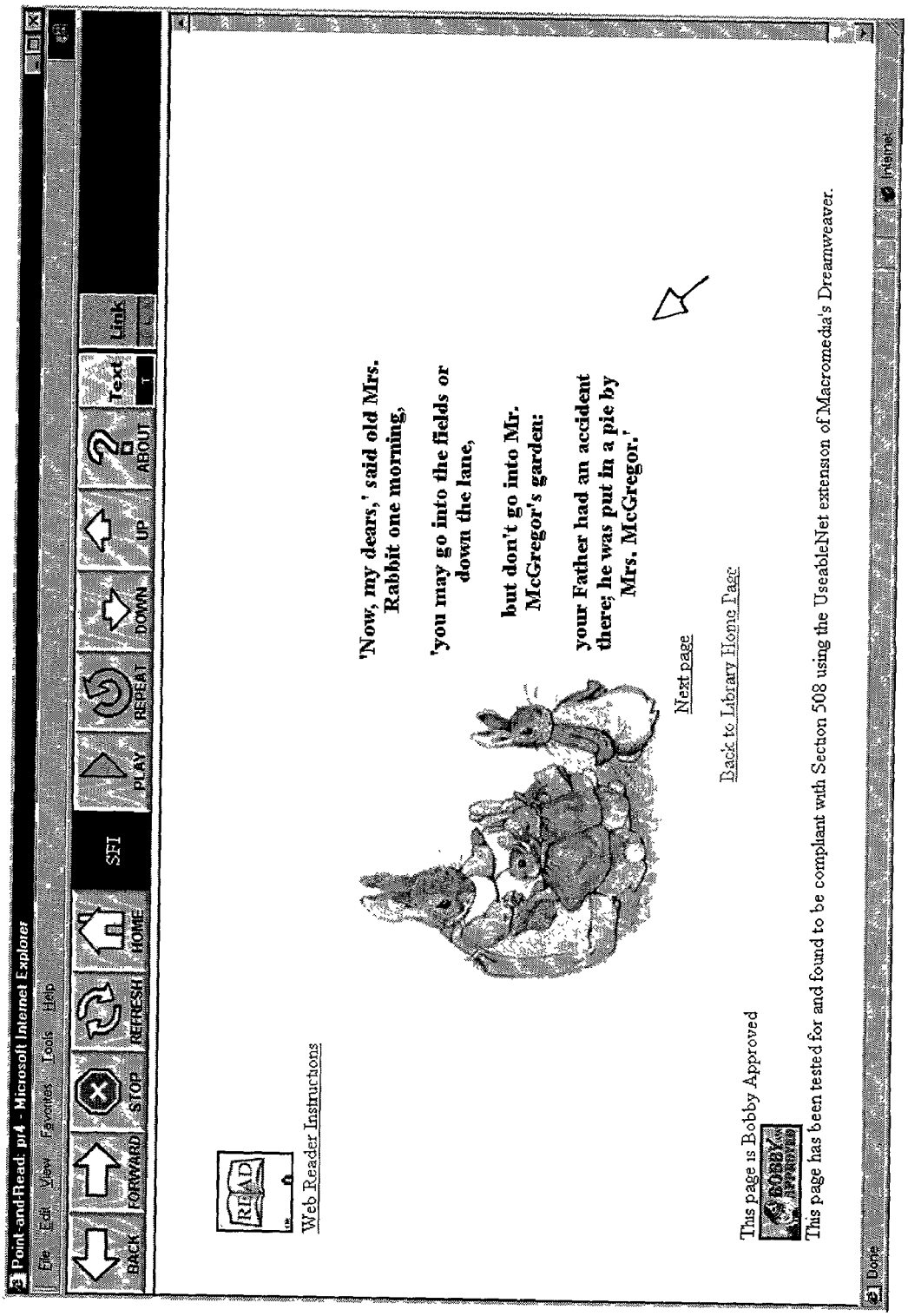

FIG. 12 shows the next web page which is the next page in the story. Again, this web page looks identical to the original web page (not shown), except that it has been modified by the translation process to be text-to-speech enabled. The mouse is not over any active region of the web page and thus nothing is highlighted in FIG. 12.

Figure 13:
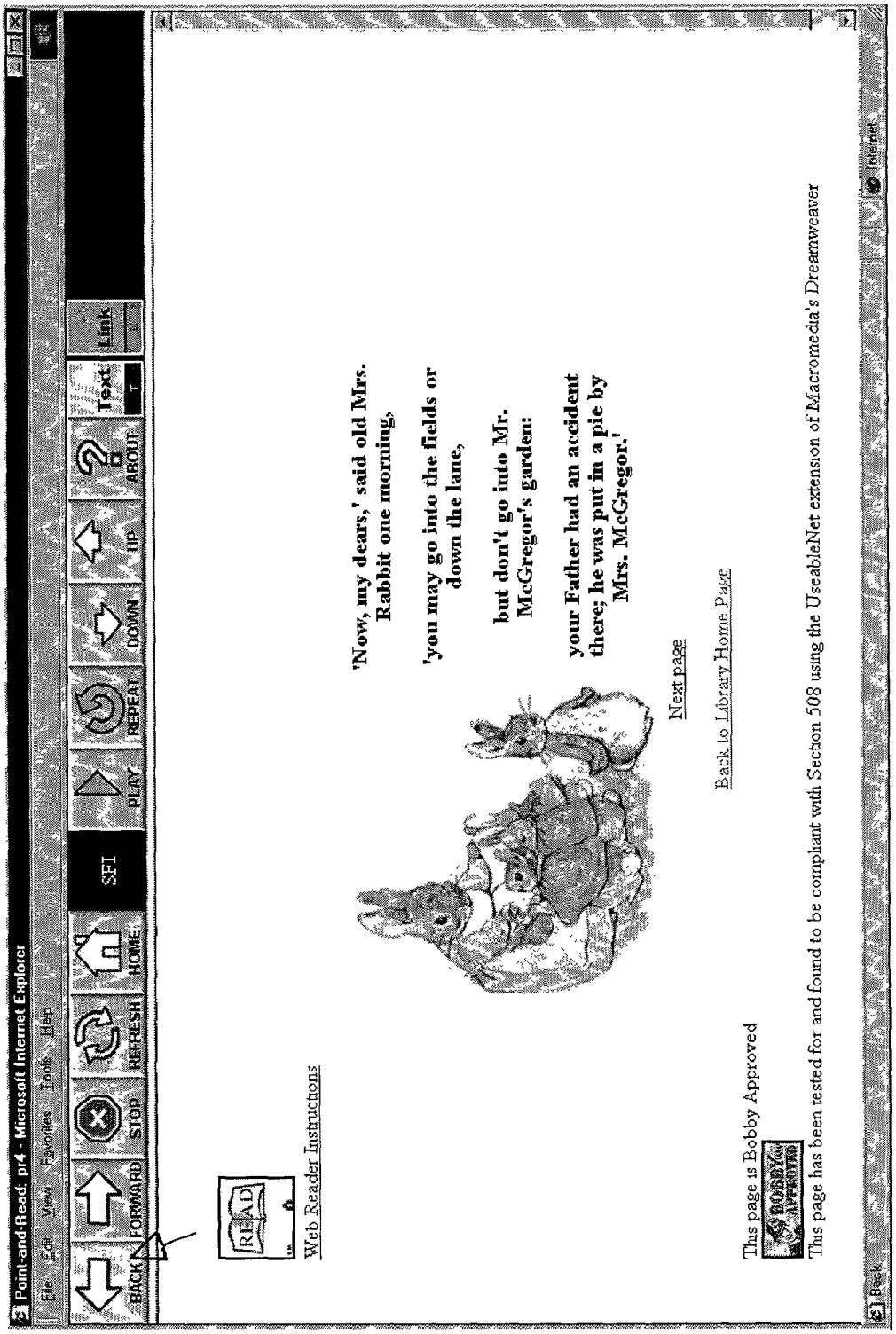

FIG. 13 shows the web page of FIG. 12 wherein the user has moved the mouse to the active region of the BACK button of the navigation toolbar. The BACK button becomes highlighted and the associated text message is automatically spoken. If the mouse remains over the active region of the BACK button for a human perceivable time period, the browser will navigate to the previous address, and thus will redisplay the web page shown in FIG. 8.

With respect to the non-linking text (e.g., sentences), the purpose of the human perceivable delay is to allow the user to visually comprehend the current active region of the document (e.g., web page) before the text is spoken. This avoids unnecessary speaking and any delays that would be associated with it. The delay may be set to be very long (e.g., 3–10 seconds) if the user has significant cognitive impairments. If no delay is set, then the speech should preferably stop upon detection of a mouseOut (onmouseOut) event to avoid unnecessary speaking. With respect to the linking text, the purpose of the human perceivable delay is to inform the user both visually (by highlighting) and aurally (by speaking the associated text) where the link will take the user, thereby giving the user an opportunity to cancel the navigation to the linked address. With respect to the navigation commands, the purpose of the human perceivable delay is to inform the user both visually (by highlighting) and aurally (by speaking the associated text) where the button graphic will take the user, thereby giving the user an opportunity to cancel the navigation associated with the button graphic.

As discussed above, one preferred grammatical unit is a sentence. A sentence defines a sufficiently large target for a user to select. If the grammatical unit is a word, then the target will be relatively smaller and more difficult for the user to select by mouse movements or the like. Furthermore, a sentence is a logical grammatical unit for the text-to-speech function since words are typically comprehended in a sentence format. Also, when a sentence is the target, the entire region that defines the sentence becomes the target, not just the regions of the actual text of the sentence. Thus, the spacing between any lines of a sentence also is part of the active region. This further increases the ease in selecting a target.

The translation process described above is an on-the-fly process. However, the translation process may be built into document page building software wherein the source code is modified automatically during the creation process.

As discussed above, the translated text-to-speech source code retains all of the original functionality as well as appearance so that navigation may be performed in the same manner as in the original web page, such as by using mouse clicks. If the user performs a mouse click and the timer that delays activation of a linking or navigation command has not yet timed out, the mouse click overrides the delay and the linking or navigation command is immediately initiated.

D. Source Code Associated with Additional Exemplary Embodiment

As discussed above, the original source code is translated into text-to-speech enabled source code. The source code below is a comparison of the original source code of the web page shown in FIG. 7 with the source code of the translated text-to-speech enabled source code, as generated by CompareRite™. Deletions appear as Overstrike text surrounded by { }. Additions appear as Bold text surrounded by [ ].

```
<!DOCTYPE HTML PUBLIC "-//IETF//DTD HTML//EN">
<html>
<head>
<meta http-equiv="Content-Type" content="text/html; charset=iso-8859-1">
<meta name="GENERATOR"content="Microsoft FrontPage 3.0">
<title>pr3</title>
[<SCRIPT LANGUAGE='JavaScript'>
    function TryToSend()
```

-continued

```
    {
        try{
            top.frames.SimTalkFrame.SetOriginalUrl(window.location.href);
        }
        catch(e){
            setTimeout('TryToSend();', 200);
        }
    }
    TryToSend();
</SCRIPT>
<NOSCRIPT>The Point-and-Read Webreader requires JavaScript to
operate.<NOSCRIPT>
<meta http-equiv="Content-Type" content="text/html; charset=iso-8859-1">
<meta name="GENERATOR" content="Microsoft FrontPage 3.0">
<title>pr3</title>
<SCRIPT LANGUAGE=JavaScript>
function AttemptCursorOver(which, theText)
{
            try{ top.frames.SimTalkframe.CursorOver(which, theText); }
            catch(e){}
}
function AttemptCursorOut(which)
{
            try{ top.frames.SimTalkframe.CursorOut(which); }
            catch(e){}
}
function AttemptCursorOverLink(which, theText, theLink, theTarget)
{
            try{ top.frames.SimTalkFrame.CursorOverLink(which, theText, theLink,
theTarget); }
            catch(e){}
}
function AttemptCursorOutLink(which)
{
            try{ top.frames.SimTalkFrame.CursorOutLink(which); }
            catch(e){}
}
function AttemptCursorOverFormButton(which)
{
            try{ top.frames.SimTalkFrame.CursorOverFormButton(which); }
            catch(e){}
}
function AttemptCursorOutFormButton(which)
{
            try{ top.frames.SimTalkFrame.CursorOutFormButton(which); }
            catch(e){}
}
</SCRIPT>
<NOSCRIPT>The Point-and-Read Webreader requires JavaScript to
operate.</NOSCRIPT>]
</head>
<body bgcolor="#FFFFFF">
<SCRIPT SRC="http://www.simtalk.com/webreader/webreader1.js"></SCRIPT>
<NOSCRIPT><P>[<SPAN id="WebReaderText0"
``` onMouseOver="AttemptCursorOver(this, 'When Java Script is enabled, clicking on the Point-and-Read logo or putting the computers cursor over the logo (and keeping it there) will launch a new window with the webreeder, a talking browser that can read this web page aloud.');" onMouseOut="AttemptCursorOut(this);">]When Java Script is enabled, clicking on the Point-and-Read™ logo or putting the computer's cursor over the logo (and keeping it there) will launch a new window with the Web Reader, a talking browser that can read this web page aloud.[</SPAN>]</P></NOSCRIPT>
<p>[
]<
[IMG
SRC='http://www.simtalk.com/webreader/webreaderlogo60.gif' border=2 ALT='Point-and-Read Webreader' onMouseOver="AttemptCursorOver(this, 'Point-and-Read webreeder');" onMouseOut="AttemptCursorOut(this);" >]
[<br><A
HREF='http://www.simtalk.com/cgi-bin/webreader.pl?originalUrl=http://www.simtalk.com/webreader/instructions.html&originalFrame=yes' onMouseOver="AttemptCursorOverLink(this, 'webreeder Instructions', 'http://www.simtalk.com/webreader/instructions.html','');"
onMouseOut="AttemptCursorOutLink(this);]"
onMouseOver="WebreaderInstructions_CursorOver( ); return true;"
onMouseOut="WebreaderInstructions_CursorOut( ); return true;">
Web Reader Instructions</a></p>
<div align="center"><center>
<table border="0" width="500">

```
<tr>
   <td><h3><IMG   SRC=["http://www.simtalk.com/li-
      brary/PeterRabbit/P3.gif]"
alt="Four little rabbits sit around the roots and trunk of a big
   fir tree."
[onMouseOver="AttemptCursorOver(this, 'Four little rab-
   bits sit around the roots and trunk of a big fir tree.');"
   onMouseOut="AttemptCursorOut(this);"] width="250"
   height="288"></h3></td>
   <td align="center"><h3>[<SPAN id="WebReaderText2"
onMouseOver="AttemptCursorOver(this, 'Once upon a
   time there were four little Rabbits, and their names were
   Flopsy, Mopsy, Cotton-tail, and Peter.');"
onMouseOut="AttemptCursorOut(this);">]ONCE upon a
   time there were four little Rabbits,
   and their names were Flopsy, Mopsy, Cotton-tail, and
Peter.</SPAN></h3>]
   [<h3><SPAN                       id="WebReaderText3"
      onMouseOver="AttemptCursorOver(this, 'They lived
      with their Mother in a sand-bank, underneath the root
      of     a     very     big     fir-tree.');"
      onMouseOut="AttemptCursorOut(this);">]They lived
      with their Mother in a sand-bank, underneath the root
      of a very big
      fir-tree.</SPAN><]/h3>
   </td>
   </tr>
</table>
</center></div><div align="center"><center>
<table border="0" width="500">
   <tr>
   <td><palign="center"><[A HREF='http://www.simtalk-
      .com/cgi-bin/webreader.pl?originalUrl=http://ww-
      w.simtalk.com/library/PeterRabbit/
      pr4.htm&originalFrame=yes'
      onMouseOver="AttemptCursorOverLink(this, 'Next
      page', 'http://www.simtalk.com/library/PeterRabbit/
      pr4.htm',");"
      onMouseOut="AttemptCursorOutLink(this);"]>Next
      page</a></p>
   <p align="center"><[A HREF='http://www.simtalk.com/
      library' onMouseOver="AttemptCursorOverLink(this,
      'Back to Library Home Page', 'http://www.simtalk-
      .com/library',");"
   onMouseOut="AttemptCursorOutLink(this);"]>Back   to
      Library
      Home Page</a></td>
   </tr>
</table>
</center></div>
[<SPAN                            id="WebReaderText6"
   onMouseOver="AttemptCursorOver(this, 'This page is
   Bobby Approved.');" onMouseOut="AttemptCursorOut
   (this);">]This page is Bobby Approved.
</SPAN>
<br><A HREF='http://www.cast.org/bobby'><IMG
onMouseOver="AttemptCursorOverLink(this,    'Bobby
   logo',         'http://www.cast.org/bobby',         ");"
   onMouseOut="AttemptCursorOutLink(this);"
SRC]="http://www.cast.org/images/approved.gif"
   alt="Bobby   logo"[onMouseOver="AttemptCursorOver
   (this, 'Bobby logo');"
onMouseOut="AttemptCursorOut(this);"></a><br>
<SPAN                            id="WebReaderText7"
   onMouseOver="AttemptCursorOver(this,'] This page has
   been tested for and found to be compliant with Section
   508 using the UseableNet extension of [Macromedias
   Dreamweaver.');"     onMouseOut="AttemptCursorOut
   (this);">This page has been tested for and found to be
   compliant with Section 508 using the UseableNet exten-
   sion of] Macromedia's Dreamweaver.[</SPAN><SPAN
   id="WebReaderText8"
onMouseOver="AttemptCursorOver(this,");"
onMouseOut="AttemptCursorOut(this);">
</SPAN>
```

```
<SCRIPT LANGUAGE=JavaScript>
    function AttemptStoreSpan(whichItem, theText)
    {
        top.frames.SimTalkFrame.StoreSpan(whichItem, theText);
    }
    function SendSpanInformation()
    {
        try
        {
            AttemptStoreSpan(document.all.WebReaderText0, "When Java
Script is enabled, clicking on the Point-and-Read logo or putting the computers cursor over
the logo (and keeping it there) will launch a new window with the webreeder, a talking
browser that can read this web page aloud.");
            AttemptStoreSpan(document.all.WebReaderText1, "webreeder
Instructions");
            AttemptStoreSpan(document.all.WebReaderText2, "Once upon a
time there were four little Rabbits, and their names were Flopsy, Mopsy, Cotton-tail, and
Peter.");
            AttemptStoreSpan(document.all.WebReaderText3, "They lived with
their Mother in a sand-bank, underneath the root of a very big fir-tree.");
            AttemptStoreSpan(document.all.WebReaderText4, "Next page");
            AttemptStoreSpan(document.all.WebReaderText5, "Back to Library
Home Page");
            AttemptStoreSpan(document.all.WebReaderText6, "This page is
Bobby Approved.");
            AttemptStoreSpan(document.all.WebReaderText7, "This page has
been tested for and found to be compliant with Section 508 using the UseableNet extension
of Macromedias Dreamweaver.");
        }
        catch(e)
```

```
            {
                setTimeout("SendSpanInformation()", 1000);
            }
        }
        SendSpanInformation();
    </SCRIPT>
    <NOSCRIPT>The Point-and-Read Webreader requires JavaScript to
operate.</NOSCRIPT>]
</body>
```

</html>

The text parsing required to identify sentences in the original source code for subsequent tagging by the span tags is preferably performed using Perl. This process is well known and thus is not described in detail herein. The Appendix provides source code associated with the navigation toolbar shown in FIGS. 8–13.

E. Client-Side Embodiment

An alternative embodiment of the web reader is coded as a stand-alone client-based application, with all program code residing on the user's computer, as opposed to the online server-based embodiment previously described. In this client-based embodiment, the web page parsing, translation and conversion take place on the user's computer, rather than at the server computer.

The client-based embodiment functions in much the same way as the server-based embodiment, but is implemented differently at a different location in the network. This implementation is preferably programmed in C++, using Microsoft Foundation Classes ("MFC"), rather than a CGI-type program. The client-based Windows implementation uses a browser application based on previously installed components of Microsoft Internet Explorer.

Instead of showing standard MFC buttons on the user interface, this implementation uses a custom button class, one which allows each button to be highlighted as the cursor passes over it. Each button is oversized, and allows an icon representing its action to be shown on its face. Some of these buttons are set to automatically stay in an activated state (looking like a depressed button) until another action is taken, so as to lock the button's function to an "on" state. For example, a "Play" button activates a systematic reading of the web page document, and reading continues as long as the button remains activated. A set of such buttons is used to emulate the functionality of scroll bars as well.

The document highlighting, reading and navigation is accomplished in a manner similar to the server-based embodiment following similar steps as the online server-based webreaders described above.

First, for the client-based embodiment, when the user's computer retrieves a document (either locally from the user's computer or from over the Internet or other network), the document is parsed into sentences using the "Markup Services" interface to the document. The application calls functions that step through the document one sentence at a time, and inserts span tags to delimit the beginning and end of each sentence. The document object model is subsequently updated so that each sentence has its own node in the document's hierarchy. This does not change the appearance of the document on the screen, or the code of the original document.

The client-based application provides equivalent functionality to the onMouseOver event used in the previously described server-based embodiment. This client-based embodiment, however, does not use events of a scripting language such as Javascript or VBScript, but rather uses Microsoft Active Accessibility features. Every time the cursor moves, Microsoft Active Accessibility checks which visible accessible item (in this case, the individual sentence) the cursor is placed "over." If the cursor was not previously over the item, the item is selected and instructed to change its background color. When the cursor leaves the item's area (i.e., when the cursor is no longer "over" the item), the color is changed back, thus producing a highlighting effect similar to that previously described for the server-based embodiment.

When an object such as a sentence or an image is highlighted, a new timer begins counting. If the timer reaches its end before the cursor leaves the object, then the object's visible text (or alternate text for an image) is read aloud by the text-to-speech engine. Otherwise, the timer is cancelled. If the item (or object) has a default action to be performed, when the text-to-speech engine reaches the end of the synthetically spoken text, another timer begins counting. If this timer reaches its end before the cursor leaves the object, then the object's default action is performed. Such default actions include navigating to a link, pushing or activating a button, etc. In this way, clickless point-and-read navigation is achieved and other clickless activation is accomplished.

The invention is not limited to computers operating a Windows platform or programmed using C++. Alternate embodiments accomplish the same steps using other programming languages (such Visual Basic), other programming tools, other browser components (e.g., Netscape Navigator) and other operating systems (e.g., Apple's MacIntosh OS).

An alternate embodiment does not use Active Accessibility for highlighting objects on the document. Rather, after detecting a mouse movement, a pointer to the document is obtained. A function of the document translates the cursor's location into a pointer to an object within the document (the object that the cursor is over). This object is queried for its original background color, and the background color is changed. Alternately, one of the object's ancestors or children is highlighted.

The present invention may be implemented with any combination of hardware and software. If implemented as a computer-implemented apparatus, the present invention is implemented using means for performing all of the steps and functions described above.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method of translating an original web page to a visually displayable text-to-speech enabled web page, the original web page being defined by source code including at least text designated for display, the method comprising:
    (a) parsing the text of the source code designated for display into one or more grammatical units;
    (b) associating a tag with each of the grammatical units;
    (c) associating an event handler with each of the tags, the event handler invokes text-to-speech software code; and
    (d) reassembling the original web page source code with the associated tags and event handlers to form visually displayable text-to-speech enabled web page source code, wherein when an event associated with an event handler occurs during user interaction with a display of a text-to-speech enabled web page, the text-to-speech software code causes the grammatical unit associated with the tag of the event handler to be automatically spoken.

2. The method of claim 1 wherein the user interacts with the display via a pointing device, and the event is a MouseOver event associated with the pointing device.

3. The method of claim 2 wherein each tag has an active region and the event handler delays invoking the text-to-speech software code until the pointing device persists in the active region of a tag for greater than a preset time period.

4. The method of claim 3 wherein the preset time period is a human perceivable time period.

5. The method of claim 1 wherein the source code further includes one or more images designated for display, one or more of the images including an associated text message, step (c) further comprising associating an event handler that invokes text-to-speech software code with each of the images that have an associated text message, and step (d) further comprising reassembling the original web page source code with the image-related event handlers, wherein when an event associated with an image-related event handler occurs during user interaction with an image in a display of a text-to-speech enabled web page, the text-to-speech software code causes the associated text message of the image to be automatically spoken.

6. The method of claim 1 wherein the grammatical units are sentences.

7. The method of claim 1 wherein the tag is a span tag.

8. The method of claim 1 wherein in step (c), the event handler invokes the text-to-speech software code by calling a function associated with a scipting language that executes text-to-speech software code.

9. The method of claim 1 wherein at least one of the grammatical units is a link having an associated address, the method further comprising:
    (e) replacing the associated address of any links with a new address that invokes a software program, the software program retrieving the source code at the associated address and then causing steps (a)–(e) to be repeated for the retrieved source code, wherein the new address becomes part of the text-to-speech enabled web page source code.

10. A method of translating an original document to a visually displayable text-to-speech enabled document, the original document including at least text, the method comprising:
    (a) parsing the text of the original document into one or more grammatical units;
    (b) associating a tag with each of the grammatical units;
    (c) associating an event handler with each of the tags, the event handler invokes text-to-speech software code; and
    (d) reassembling the original document with the associated tags and event handlers to form a visually displayable text-to-speech enabled document, wherein when an event associated with an event handler occurs during user interaction with a display of a text-to-speech enabled document, the text-to-speech software code causes the grammatical unit associated with the tag of the event handler to be automatically spoken.

11. The method of claim 10 wherein the grammatical units are sentences.

12. A method of allowing a user to interact with a web page displayed on a display device, wherein the web page includes one or more links that have an associated text message, the method comprising:
    (a) positioning a pointing device over a link, the link being automatically highlighted whenever the pointing device is over the link;
    (b) automatically loading the associated text message of the link into a text-to-speech engine, the associated text message thereby being automatically spoken; and
    (c) automatically navigating to the address of the link, wherein steps (a), (b) and (c) occur sequentially and without requiring any further user manipulation of the pointing device or any other user interfaces associated with display device.

13. The method of claim 12 wherein step (c) occurs only if the pointing device persists over the link for greater than a preset time period.

14. The method of claim 13 wherein the preset time period is a human perceivable time period.

15. The method of claim 13 wherein the preset time period is at least about one second.

16. The method of claim 12 wherein the link is hypertext and the associated text message is the text of the hypertext.

17. The method of claim 12 wherein the link is an image and the associated text message is alternate text of the image.

18. An article of manufacture for translating an original web page to a visually displayable text-to-speech enabled web page, the original web page being defined by source code including at least text designated for display, the article of manufacture comprising a computer-readable medium holding computer-executable instructions for performing a method comprising:
    (a) parsing the text of the source code designated for display into one or more grammatical units;
    (b) associating a tag with each of the grammatical units;
    (c) associating an event handler with each of the tags, the event handler invokes text-to-speech software code; and
    (d) reassembling the original web page source code with the associated tags and event handlers to form visually displayable text-to-speech enabled web page source code, wherein when an event associated with an event handler occurs during user interaction with a display of a text-to-speech enabled web page, the text-to-speech software code causes the grammatical unit associated with the tag of the event handler to be automatically spoken.

19. The article of manufacture of claim 18 wherein the user interacts with the display via a pointing device, and the event is a MouseOver event associated with the pointing device.

20. The article of manufacture of claim 19 wherein each tag has an active region and the event handler delays invoking the text-to-speech software code until the pointing device persists in the active region of a tag for greater than a preset time period.

21. The article of manufacture of claim 20 wherein the preset time period is a human perceivable time period.

22. The article of manufacture of claim 18 wherein the source code further includes one or more images designated for display, one or more of the images including an associated text message, step (c) further comprising associating an event handler that invokes text-to-speech software code with each of the images that have an associated text message, and step (d) further comprising reassembling the original web page source code with the image-related event handlers, wherein when an event associated with an image-related event handler occurs during user interaction with an image in a display of a text-to-speech enabled web page, the text-to-speech software code causes the associated text message of the image to be automatically spoken.

23. The article of manufacture of claim 18 wherein the grammatical units are sentences.

24. The article of manufacture of claim 18 wherein the tag is a span tag.

25. The article of manufacture of claim 18 wherein in step (c), the event handler invokes the text-to-speech software code by calling a function associated with a scripting language that executes text-to-speech software code.

26. The article of manufacture of claim 18 wherein at least one of the grammatical units is a link having an associated address, and the computer-executable instructions perform a method further comprising:
  (e) replacing the associated address of any links with a new address that invokes a software program, the software program retrieving the source code at the associated address and then causing steps (a)–(e) to be repeated for the retrieved source code, wherein the new address becomes part of the text-to-speech enabled web page source code.

27. An article of manufacture for translating an original document to a visually displayable text-to-speech enabled document, the original document including at least text, the article of manufacture comprising a computer-readable medium holding computer-executable instructions for performing a method comprising:
  (a) parsing the text of the original document into one or more grammatical units;
  (b) associating a tag with each of the grammatical units;
  (c) associating an event handler with each of the tags, the event handler invokes text-to-speech software code; and
  (d) reassembling the original document with the associated tags and event handlers to form a visually displayable text-to-speech enabled document, wherein when an event associated with an event handler occurs during user interaction with a display of a text-to-speech enabled document, the text-to-speech software code causes the grammatical unit associated with the tag of the event handler to be automatically spoken.

28. The article of manufacture of claim 27 wherein the grammatical units are sentences.

29. An article of manufacture for allowing a user to interact with a web page displayed on a display device, wherein the web page includes one or more links that have an associated text message, the article of manufacture comprising a computer-readable medium holding computer-executable instructions for performing a method comprising:
  (a) positioning a pointing device over a link, the link being automatically highlighted whenever the pointing device is over the link;
  (b) automatically loading the associated text message of the link into a text-to-speech engine, the associated text message thereby being automatically spoken; and
  (c) automatically navigating to the address of the link, wherein steps (a), (b) and (c) occur sequentially and without requiring any further user manipulation of the pointing device or any other user interfaces associated with display device.

30. The article of manufacture of claim 29 wherein step (c) occurs only if the pointing device persists over the link for greater than a preset time period.

31. The article of manufacture of claim 30 wherein the preset time period is a human perceivable time period.

32. The article of manufacture of claim 30 wherein the preset time period is at least about one second.

33. The article of manufacture of claim 29 wherein the link is hypertext and the associated text message is the text of the hypertext.

34. The article of manufacture of claim 29 wherein the link is an image and the associated text message is alternate text of the image.

* * * * *